US011224823B2

(12) United States Patent
Hospodor et al.

(10) Patent No.: US 11,224,823 B2
(45) Date of Patent: Jan. 18, 2022

(54) METHOD AND APPARATUS FOR SHARING CO-GENERATED ENERGY WHEN PROCESSING ESSENTIAL ELEMENTS DERIVED FROM PLANT MATTER

(71) Applicants: Andrew David Hospodor, Santa Cruz, CA (US); Robert James Rapp, San Jose, CA (US)

(72) Inventors: Andrew David Hospodor, Santa Cruz, CA (US); Robert James Rapp, San Jose, CA (US)

( * ) Notice: Subject to any disclaimer, the term of this patent is extended or adjusted under 35 U.S.C. 154(b) by 0 days.

(21) Appl. No.: 16/907,918

(22) Filed: Jun. 22, 2020

(65) Prior Publication Data

US 2020/0398180 A1   Dec. 24, 2020

Related U.S. Application Data

(60) Provisional application No. 62/865,262, filed on Jun. 23, 2019.

(51) Int. Cl.
*B01D 1/00*   (2006.01)
*B01D 5/00*   (2006.01)
(Continued)

(52) U.S. Cl.
CPC ......... *B01D 1/0058* (2013.01); *B01D 1/0082* (2013.01); *B01D 1/225* (2013.01);
(Continued)

(58) Field of Classification Search
CPC .... B01D 1/0058; B01D 1/0082; B01D 1/225; B01D 3/085; B01D 5/0036; B01D 5/0051;
(Continued)

(56) References Cited

U.S. PATENT DOCUMENTS 2,637,684 A * 5/1953 Buffum ................ B01D 1/2846
203/1
3,864,215 A * 2/1975 Arnold ...................... C02F 1/06
203/11
(Continued)

*Primary Examiner* — Jonathan Miller
(74) *Attorney, Agent, or Firm* — Robert J. Rapp

(57) ABSTRACT

Methods and apparatus consistent with the present disclosure may provide electrical energy and thermal to extraction or separation equipment. Methods and apparatus consistent with the present disclosure may extract and concentrate essential elements plant matter. An amount of wasted heat energy collected from an engine that powers an electrical generator may be provided to an evaporation or separation process when electrical power is provided to extraction or separation processing equipment. Computers or electronics that control equipment consistent with the present disclosure may be remotely controlled via a mobile electronic device, when desired. Such computers or electronics may receive sensor data related to the operation of plant matter extractors, related separation equipment, or other equipment may be used to manage a production line. As such, methods and apparatus consistent with the present disclosure may extract essential elements from *cannabis* plant matter and process those essential elements into *cannabis* extracts or isolates.

21 Claims, 12 Drawing Sheets

(51) Int. Cl.
*B01D 1/22* (2006.01)
*B01D 11/02* (2006.01)
*B01D 3/08* (2006.01)
*F01P 3/20* (2006.01)
*F02G 5/00* (2006.01)
*F02B 63/04* (2006.01)
*G05D 7/06* (2006.01)
*G05D 13/62* (2006.01)
*G05D 23/19* (2006.01)

(52) U.S. Cl.
CPC ............ *B01D 3/085* (2013.01); *B01D 5/006* (2013.01); *B01D 5/0036* (2013.01); *B01D 5/0051* (2013.01); *B01D 5/0054* (2013.01); *B01D 11/0296* (2013.01); *F01P 3/20* (2013.01); *F02B 63/04* (2013.01); *F02G 5/00* (2013.01); *F01P 2025/08* (2013.01); *F01P 2060/00* (2013.01); *G05D 7/0617* (2013.01); *G05D 13/62* (2013.01); *G05D 23/19* (2013.01)

(58) Field of Classification Search
CPC .. B01D 5/0054; B01D 5/006; B01D 11/0296; F01P 3/20; F01P 2025/08; F01P 2060/00; F02B 63/04; F02G 5/00; G05D 7/0617; G05D 13/62; G05D 23/19
See application file for complete search history.

(56) References Cited

U.S. PATENT DOCUMENTS

| | | | |
|---|---|---|---|
| 5,435,151 A * | 7/1995 | Han | B60H 1/3233 62/272 |
| 6,294,054 B1 * | 9/2001 | Sutter | B01D 3/10 202/176 |
| 9,776,102 B2 * | 10/2017 | Frick | C02F 1/16 |
| 9,956,498 B1 * | 5/2018 | Tucker | B01D 3/001 |
| 10,800,668 B2 * | 10/2020 | Sakaray | B01D 1/0058 |
| 2015/0075967 A1 * | 3/2015 | Zebuhr | B01D 1/2893 203/11 |
| 2018/0140965 A1 * | 5/2018 | Flora | C11B 1/10 |
| 2020/0079660 A1 * | 3/2020 | Sakaray | B01D 1/0082 |

* cited by examiner

METHOD AND APPARATUS FOR SHARING CO-GENERATED ENERGY WHEN PROCESSING ESSENTIAL ELEMENTS DERIVED FROM PLANT MATTER

CROSS-REFERENCE TO RELATED APPLICATIONS

The present application incorporates by reference, is a continuation of, and claims the priority benefit of Provisional U.S. patent application 62/865,262 that was filed on Jun. 23, 2019

BACKGROUND OF THE DISCLOSURE

Field of the Invention

The present disclosure is directed to method and apparatus for generating power for processing essential elements derived from plant matter. More specifically, the present disclosure is directed to providing power to a system that can be mobile.

Description of the Related Art

The market for extracting essential elements from plant matter is expanding rapidly. One of the primary drivers for this market expansion is the recreational legalization of *cannabis* in Canada, legalized *cannabis* for medical or recreational use in different states in the United States, and interest in extracting non-psychoactive cannabinoids from industrial hemp.

Many farmers located throughout Canada and the United States are interested in extracting essential elements from that plant matter, yet these farmers often do not have access to extraction technology that efficiently provides them with extracts in a timely convenient way. In fact, while various *cannabis* extractors operate within the United States and while extraction facilities are being built in other countries, each of these extraction facilities require plant matter to be shipped to an extraction facility. In certain instances, such extraction facilities could be located hundreds or even thousands of miles from a significant number of farmers. In other instances farmers may be overwhelmed if they attempt to build their own independent extraction facilities. In yet other instances, plant matter may need to cross territorial, provincial, state or country borders with differing laws governing the transportation of plant matter and essential elements.

By having to ship large volumes of *cannabis* plant matter from one point to another, farmers are faced with many factors that are beyond their control that could negatively impact their businesses. These factors include theft, damaged plant matter, decaying plant matter, transportation costs, and differences in laws (that may include regulations, taxes, or tariffs) between one municipality and another municipality. Plant matter shipped over long distances can be damaged by molding, insect infestation, or degradation from heat or sun exposure. Furthermore, when hundreds or thousands of farmers send their plant material for processing at a centralized facility, a farmer has little ability to verify that the extracted essential elements that they receive from an extraction facility really came from the plant matter that they grew. Another solution that many farmers may consider is to invest in purchasing their own extraction equipment. The purchasing of capital equipment, also comes with several other detracting factors that include high purchase prices, limited throughput, limited scale-ability, technological obsolescence, efficiency, high energy costs, high operating costs associated with skilled labor, and maintenance costs may cause farmers to be uncompetitive.

What is needed are method and apparatus that bring extraction facilities closer to farmers, such that risks that farmers face can be mitigated, that provides these farmers with efficient and technologically appropriate extraction/concentration solutions, and that provides farmers with the ability to control and track their own inventories of plant matter and plant matter extracts, concentrates, or isolates of plant essential elements.

SUMMARY

The present disclosure is directed to methods, non-transitory computer readable storage mediums, and systems that control energy distributed to a system that separates substances included in a cannabinoid containing material. A method consistent with the present disclosure may heat at least a portion of a separation apparatus by transferring thermal energy from an engine to the separation apparatus and may chill a condenser by providing a chilled fluid to the condenser. The present method may also provide a flow of a cannabinoid containing material into an input of the separator where a first substance included in the cannabinoid containing material is evaporated when the cannabinoid containing material is heated to an evaporation temperature. The first material may also be condensed at the condenser based on a cooling temperature associated with the condenser. An electronic control system may control an amount of electrical power provided to a plurality of different devices. The electrical power may be generated by a generator coupled to the engine. The method may also include the electronic control system making an adjustment, the adjustment may maintain the heating temperature at the separation apparatus or may maintain the cooling temperature associated with the first condenser according to a power budget. The electronic control system may make the adjustment when the amount of power provided to the different devices approaches, meets, or exceeds a threshold level of the power budget.

When the presently claimed invention is implemented as a non-transitory computer readable storage medium, a processor executing instructions out of a memory may control a method consistent with the present. Hera again the method may heat at least a portion of a separation apparatus by transferring thermal energy from an engine to the separation apparatus and may chill a condenser by providing a chilled fluid to the condenser. The method may also provide a flow of a cannabinoid containing material into an input of the separator where a first substance included in the cannabinoid containing material is evaporated when the cannabinoid containing material is heated to an evaporation temperature. The first material may also be condensed at the condenser based on a cooling temperature associated with the condenser. An electronic control system may control an amount of electrical power provided to a plurality of different devices. The electrical power may be generated by a generator coupled to the engine. The method may also include the electronic control system making an adjustment, the adjustment may maintain the heating temperature at the separation apparatus or may maintain the cooling temperature associated with the first condenser according to a power budget. The electronic control system may make the adjustment when the amount of power provided to the different devices approaches, meets, or exceeds a threshold level of the power budget.

A system consistent with the present disclosure may include an engine, a generator, a separation apparatus, a condenser, and an electronic control system. The engine may be coupled to a generator that provides electrical power to a plurality of different devices and thermal energy generated by operation of the engine may be provided to the separator to controllably evaporate a first substance included in a cannabinoid containing material and to condense the first substance in the condenser. When the cannabinoid containing material is provided to an input of the separator, a heating temperature at the separator may evaporate the first substance and a cooling temperature associated with the condenser may condenses the first substance at the condenser. The condenser may be cooled by providing a chilled fluid to the condenser. The electronic control system may monitory an amount of electrical power provided to power a plurality of devices and the electronic control system may make an adjustment to maintain either the heating temperature at the separation apparatus or to maintain the cooling temperature associated with the chiller according to a power budget. The electronic control system may make the adjustment when the amount of power provided to the plurality of devices approaches, meets, or exceeds a threshold level of the power budget.

DETAILED DESCRIPTION

Figure 1:
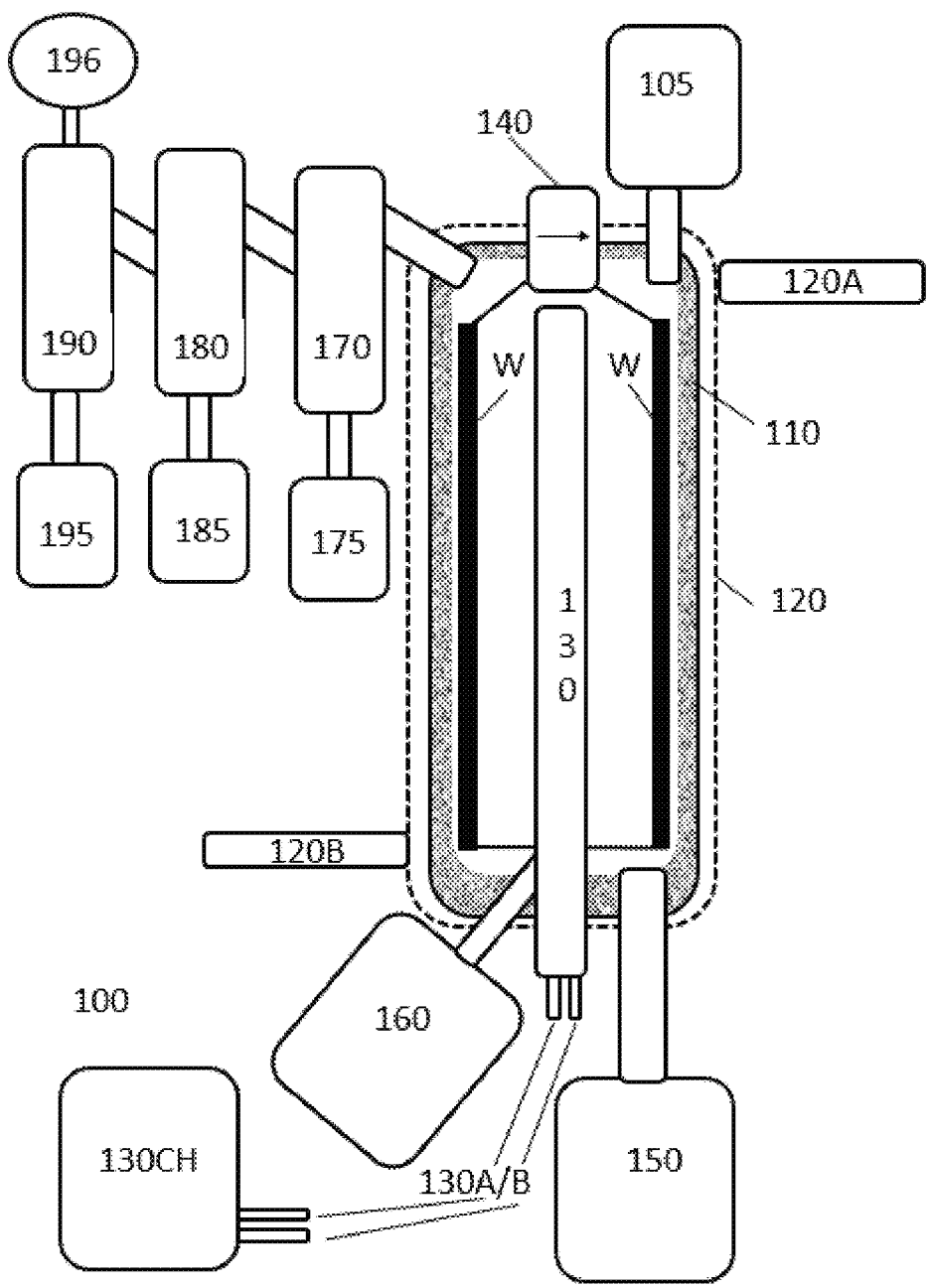
FIG. 1 illustrates a wiped film evaporation system consistent with the present disclosure.

Methods and apparatus consistent with the present disclosure may provide electrical energy and/or thermal energy to equipment used in extraction or separation of essential elements from plant material. Methods and apparatus consistent with the present disclosure may extract and concentrate plant matter essential elements. An amount of wasted heat energy collected from an engine that powers an electrical generator may be provided to a separation process when electrical power is provided to extraction, separation, or other processing equipment. Control systems that that control equipment consistent with the present disclosure may be remotely controlled via a mobile electronic device, such as a tablet device or a cellular phone. Such a control system may receive sensor data related to the operation of plant matter extractors, related separation equipment, or other equipment. As such, methods and apparatus consistent with the present disclosure may extract essential elements from *cannabis* plant matter and process those essential elements into *cannabis* extracts or isolates.

Methods and apparatus consistent with the present disclosure may include an analytical system capable of testing *cannabis* plant matter, may generate eluates during an extraction, or may collect materials output from an evaporator. Examples of analytical test systems consistent with the present disclosure include an Agilent 4000 tester, an Agilent 12000 ultra (or high) pressure liquid chromatograph (UPCL/HPLC), a gas chromatograph (GC), and a Triple Quad Mass Spectrometer. These analytical systems may be capable of assaying cannabinoid masses, terpene distributions, or distributions of other essential elements associated with *cannabis* plants. These analytical systems may also be capable of identifying the presence of or concentration of contaminates such as pesticides, heavy metals, fungicides, or mold spores in *cannabis* plant matter, eluates, or in materials output from extraction or concentration processes consistent with the present disclosure.

Analytical test systems consistent with the present disclosure may be used to test plant matter before an extraction process is performed on that plant matter. In instances where the plant matter is contaminated with pesticides, for example, that lot of plant matter may be rejected and not processed based on results of the testing. In other instances, contaminates from extracted plant matter may be separated from cannabinoids or other plant matter essential elements. Contaminates extracted from plant matter may be isolated and output via an output port of a separation system that may be an evaporation, membrane, or other separator. Such a product could prevent contaminates by a vessel that collects cannabinoids or certain selected plant terpenes (e.g. lighter monoterpenes or heavier sesquiterpenes). For example, the contaminate may be evaporated and condensed in an output vessel at a temperature that does not condense cannabinoids or the contaminate may not be evaporated when it is separated from other materials. A filter may be used to separate contaminates that are larger cannabinoids or cannabinoids may be evaporated when contaminates are not. As such, contaminates may be prevented separated from other materials by controlling which elements are evaporated and condensed. In certain instances, a membrane extraction system may be operated in a manner that separates contaminates from other elements extracted from plant matter. After an extraction process is complete, volumes of clean solvents may be used to flush and clean any portion of a extraction-separation system or the entire extraction-separation system. During such a process, solvent output from a hopper/extractor or other parts of the system may be tested by the test system to identify whether contaminates are still present after one or more cleaning cycles. As such, different portions of a system may be cleaned by flushing clean solvent through the system and by isolating contaminates in an output vessel. Finally, when contaminates have been reduced to or below a threshold level or entirely removed (as verified by testing by the analytical test system), the cleaning cycle may be ended.

During normal operation, clean solvent may be introduced into an extraction system and then sent to a separation system. Samples of solvent/eluate may be passed to the analytical test system and the test system may identify when an extraction process is complete when cannabinoids measured in the solvent/eluate output from the extraction system have been reduced to or below a threshold level. The passing of the solvent/eluate may be passed to the test system via a valve controlled by a control system such that testing and extraction/separation may be performed automatically when the control system controls and potentially monitors each of the components in an extraction/separation system consistent with the present disclosure.

Embodiments of the present disclosure may include an analytical weight system that may be calibrated by measuring a weight of raw *cannabis* plant material. A sample of the raw plant material may also be weighed and that sample may be provided to a test system that tests the sample to identify a weight of cannabinoids that are included in the sample. When the sample is representative of the weighted of raw *cannabis* plant matter, a weight of cannabinoids included in the weighed raw *cannabis* plant matter may be calculated (estimated) based on the sample test results. Next after an extraction is performed on the raw *cannabis* plant matter and after the cannabinoids are separated from extracted plant matter materials, a weight of cannabinoids recovered from the extraction process may be compared to the calculated/estimated cannabinoid weight when checking the calibration of an overall extraction/separation apparatus efficiency or accuracy. Estimates relating to extracted weights of other materials extracted from the raw *cannabis* plant matter may also be compared to actual material weights output from an extraction or separation process. In such instances, weights of cannabinoids, light terpenes (e.g. monoterpenes) or heavy terpenes (e.g. sesquiterpenes) may be used to validate the efficiency or accuracy of an extraction or separation process.

Methods and apparatus consistent with the present disclosure may include a nitrogen generator or a hydrogen generator. Power consumed by these generators may be included in an overall energy budget as a control system manages power consumption within a power budget. Nitrogen may be used as a blanket gas that may act as a fire suppressant. Nitrogen may be introduced into an extractor displacing at least a portion of oxygen and this nitrogen may be used to controllable push extracted elements into an evaporation or separation system. As such, the pressure of nitrogen may be controlled to control an amount of throughput and the control system may monitor flows through an extraction or separation system during operation. Nitrogen may be sourced from a nitrogen tank that stores gaseous or liquid nitrogen or may be source from a nitrogen generator. Hydrogen generated by a hydrogen generator may be provide to an analytical test system and this hydrogen may be used as a clean carrier gas when the analytical test system is operated and when hydrogen gas may be required by the analytical test system. Power consumed by gas generators (e.g. nitrogen or hydrogen generators) may be included in the power budget.

Such an apparatus may include a computer that monitors or controls the distribution of thermal-heat energy or electrical power to mobile extraction and separation apparatus. Methods consistent with the present disclosure may control the distribution of electrical energy or the distribution of thermal energy from an engine-generator or other power source. In such instances, an amount of wasted heat energy collected from an engine that powers an electrical generator may be provided to a process when electrical power is provided to extraction or separation processing equipment. In certain instances, waste heat from a generator may also be used to heat fluids provided to an evaporator.

Computers or electronics that control equipment consistent with the present disclosure may be remotely controlled via a mobile electronic device, when desired. Such computers or electronics may receive sensor data. This sensor data may be related to the operation of plant matter extractors, can be related the operation of separation equipment, or can be used to control other equipment associated with an extraction and concentration of plant derived essential elements. As such, a production line that processes *cannabis* plant matter into *cannabis* extracts or isolates can be configured to operate continuously for minutes, hours, or days. Methods of the present disclosure may also use sensor data when controlling extraction and/or separation equipment while maintaining a specified power budget.

In instances where electrical power engine-generators provide energy to extract essential elements from plant matter, waste heat energy recovered from an engine may be coupled to a separation apparatus to increase the overall efficiency of systems that produce extracts or isolates from plant matter. Electrical power generators that provide electrical power to apparatus consistent with the present disclosure include generators powered by various fossil fuels (diesel, gasoline, propane, or natural gas, for example) or generators that may use other fuels (hydrogen or bio-diesel, for example). Apparatus consistent with the present disclosure may be built within a vehicle. For example, a Chevrolet (Chevy) Duramax diesel truck engine may be coupled to an Allison transmission that includes a Power Take Off (PTO) mechanism that spins a shaft of an electrical generator that in turn supplies power to an extraction/separation system. Couplings that may be configured to connect a generator to the PTO may include gears, belts, chains, or shafts. In such an instance, rotational force from an engine or engine may spin a rotational member in an electrical generator.

In certain instances, a power budget may be assigned to a set of processing equipment, this power budget may identify an optimal or a maximum amount of power that should or that can be applied to an extraction and/or a separation process. Such a power budget may include electrical power from a generator connected to a diesel, natural gas, gasoline, or kerosene engine that may be in the form of internal combustion engine or a turbine engine. Furthermore, the power budget may be supplemented by a connection to an existing public or private electrical utility power grid or may be supplemented by power generated from a natural-gas supply source or pipe. Such a power budget may allocate an amount of energy or power that should be applied to respective pieces of individual manufacturing processing equipment. For example, given a power budget of 100 Kilo-watts per hour (KWh), a diesel generator could burn approximately 7 gallons of diesel fuel per hour to meet this power budget. Alternatively other forms of generators could be used to meet this power budget. Such other generators include a gas turbine engine-generator, a Flex-fuel turbine generator, a natural gas or propane generator, or a linear generator (like those built by ETAGEN). Again, considering a power budge of 100 KWh, turbine engines could be provided enough natural gas of natural gas to meet this electrical power requirement with an efficiency of approximately 83%. Since conventional natural gas distribution systems contain approximately 1000 British thermal units (BTUs) per cubic foot of natural gas (or about 0.297 KWh/cubic foot of natural gas), an amount of cubic feet of natural gas to provide to a gas turbine engine-generator can be calculated to meet this 100 KWh electrical power budget using the Formula 1 below. Note, that when solved, Formula 1 (below) identifies that the required cubic feet of natural gas to provide to such a turbine engine-generator to meet this power budget should be approximately 405.7 cubic feet of natural gas per hour. Existing high pressure natural gas utilities found in the United States and Canada are capable of supplying such volumes. Similar formulas to Formula 1 could be used to identify an amount of fuel that must be provided to a generator using virtually any fuel: propane, methane, diesel, or gasoline, for example. In certain instances such fuels may be provided to a location via a pipe/pipeline or such fuels may be driven on a vehicle to a location where plant matter is processed. Control systems consistent with the present disclosure may receive sensor that senses an amount of power provided to the system or could measure an amount of fuel consumed. Sensors could sense volume of liquid fuel or flows of liquid or gaseous fuel as an extraction-separation system is operated. All of this sensor data can be received by the control system as the control system controls apparatus consistent with the present disclosure.

$$\frac{\text{Required CuFt}}{100 \text{ KWh}} = \frac{1 \text{ CuFt}}{0.297 \text{ KWh}} \times \frac{1}{0.83} \qquad \text{Formula 1}$$

Apparatus consistent with the present disclosure may include an extraction apparatus or a separation apparatus. The extraction apparatus will typically be used to extract essential elements from plant matter. Such extracted essential elements may be then input into a separation apparatus where a separation of different substances may be performed. Separators that may be used with the present disclosure may include wiped film evaporators, rotary evaporators, thin film evaporators of various sorts, falling film evaporators, spinning band evaporation/distillation apparatus, spinning extractors, fractal distillation apparatus, molecular distillation apparatus, short-path distillation apparatus, membrane separators, cavitation based extractors/separators, or other types of separators.

Evaporation and separation systems consistent with the present disclosure may use methods consistent with U.S. Pat. No. 8,343,553 (U.S. patent application Ser. No. 13/066,585 and U.S. patent application publication 2012/0263804), U.S. Pat. No. 9,358,259 (U.S. patent application Ser. No. 13/506,010, U.S. patent publication 2013/0251824, and patent publication 2016/0279183) U.S. Pat. No. 9,155,767 (application Ser. No. 14/880,260, patent publication 2014/0113010, and patent publication 2016/0074450) or U.S. Pat. No. 9,155,767 (U.S. patent application Ser. No. 14/880,260, U.S. patent application publication 2016/0074450) that are incorporated by reference into the present disclosure. These patents involve extraction systems and methods that extract essential elements from *cannabis* plant matter after a hopper has been filled with *cannabis* plant matter. U.S. Pat. No. 9,155,767 (U.S. patent application Ser. No. 14/880,260, U.S. patent application publication 2016/0074450) describe evaporation systems that may be coupled to an extraction system in novel ways.

Extraction systems that may be controlled by a control system may include any form of extraction system known in the art. As such, extractors or methods consistent with the aforementioned incorporated by reference patents and patent applications, extractors of any form may be used to extract essential elements from plant matter. Amount of power consumed by any form of extractor such as carbon dioxide ($CO_2$), extractors that use substances that are liquid at room temperatures/pressures (e.g. ethanol, hexane, or heptane), extractors that use solvents that are in a gaseous form at room temperatures/pressures (e.g. butane or propane), or extractors that use cavitation or rotation to perform an extraction may be controlled by methods or apparatus consistent with the present disclosure. While certain of these extractors use lower pressures and others may use higher pressures, power consumed by any of them may be included in a power budget. As such power consumed by: control systems, compressors (e.g. compressors that recover $CO_2$ or butane/propane, or compressors that compress a refrigerant), pumps (vacuum or solvent pumps), driers that dry plant matter/solvent saturated plant matter, heat transfer control apparatus (heaters/chiller), or power consumed by other apparatus consistent with the present disclosure may be included in the power budget.

In an instance when cavitation extraction systems are used, extractors may mix plant matter with water or another solvent in a way that destroys plant matter using sheer forces. This may result in a mix that includes water and molecules of plant matter essential elements. Such cavitation extraction systems may dismember plant cellular materials at a molecular level, this could cause both water-soluble materials and hydrophobic (non-water-soluble) materials to be dispersed in water or in another solvent. In order to effectively separate hydrophobic materials like cannabinoids, for example, from water, solvents lighter than water may be used. As such, solvents other than water that are approved for contact with food items by the FDA, or listed in the US Pharmacopeia (USP) may be preferred. As such, solvents like ethanol, hexane, heptane, or other solvents that are lighter than water, that are liquid at room temperature, and that have the capacity to dissolve specific target materials could be used in a cavitation extraction system. One notable disadvantage cavitation extraction systems that use water is that such apparatus can generate large amounts of contaminated water. This is because, such a process would require a moderate or large amount of water and because water-soluble salts and other contaminates would be dispersed in such a watery layer. This contaminated water would likely require post processing to separate water from these contaminates.

In certain instances more than one solvent may be used when plant matter is extracted or when plant matter essential elements are separated. For example, a combination of ethanol, hexane mixed with water and extracted plant matter essential elements would cause three layers, a watery layer that may include water borne components or contaminates, a layer including ethanol, and a layer including hexane and dissolved hydrophobic materials—that may include essential elements like cannabinoids or plant terpenes.

Extracts prepared by other means besides the aforementioned cavitation extraction method may also be combined with solvents, including combinations of solvents to separate hydrophobic materials from water soluble materials and contaminates. For example, *cannabis* extracts derived using solvent extraction of any means, including, yet not limited to alcohol, ethanol, pentane, hexane, heptane, butane, propane, or $CO_2$ could be mixed with one or more solvents (that may include water). Here again a mixture of water, ethanol, hexane, and extracted materials would separate water-soluble materials from hydrophobic materials. In such an instance, relatively little water would be used as compared to a water driven cavitation process, because the mass of an extract is many times less than the mass of raw plant matter.

Methods and apparatus consistent with the present disclosure may also include separation systems that help liquefy previously extracted concentrates before they are processed further. For example, $CO_2$ derived plant extracts may be combined with ethanol or hexane before being provided to an evaporator. These methods and apparatus may also include combining solvents or water with extracted materials in controlled ways. For example, the process of mixing extracted materials, water, alcohol, and/or hexane may be combined. Power consumed by such a mixing process may also be included in a power budget. These mixing processes may also include chilling materials used in such a process when performing a step that is sometimes referred to a "winterization" that is used to remove fats and waxes. Alternatively some of these materials may be heated during such processes. The controlled combining of such materials, chilling of such materials, or heating of such materials may also associated with power or thermal energy metrics that may be included in the power budget. Mixing of an extract may include heating the extract to melt or soften it. This mixing could be performed by rotating a member in a vessel, by providing a sonic or ultrasonic stimulation, by a applying a magnetic field and spinning a magnetic member inside of the vessel, by pumping a gas from a port on a top portion of the vessel to a bottom port of the vessel, or by rotating the vessel, for example.

Sensors included in a vessel where various solvents are combined with plant matter extracts may be used to identify boundary layers in addition to the volume of plant material and/or solvents in the vessel. Sensors capable of discerning between water, ethanol, and hexane may provide data to the control system as the control system controls a layer separation process. After a combination of plant extracted materials, water, ethanol, and hexane has been formed into layers, these sensors could be used to sense a type of material currently being drained off of the bottom of or sucked off of the top of a vessel containing such a combination. The control system coupled to this vessel could then control valves to pass watery components along a first pathway, then to switch components that include ethanol to pass along a second pathway, and then to switch components that included hexane along a third pathway in an embodiment of the invention.

Solvents used in an extraction may include any of a number of solvents even though solvents that are approved for contact with food and that are liquid at room temperature & pressure may be preferred. As such, solvents such as hexane, n-hexane, heptane, alcohol, or ethanol may be preferred. Alternatively or additionally other solvents may be used including $CO_2$ or solvents that are in a gaseous form at room temperature & pressure (such as butane, n-butane, propane, or other similar solvents) may be used when desired.

In an example, an extraction of plant matter is performed according to a first metric in an energy budget, extracted materials that may be in the form of an eluate (a mixture of extracted plant matter essential elements and solvent) that may be of the type described in the patents and patent applications incorporated by reference into the present disclosure may be provided to a separator. Such a separator may perform a separation according to a second metric in the energy budget. In such an instance, a first substance may be output from a first output of the separator and a second substance may be output from a second output of the separator. The first substance may be a solvent and the second substance may include one or more cannabinoids and other essential elements.

Separators may also include a third output that outputs essential elements extracted from plant matter with different evaporation points, different chemical compositions, or different molecular weights. A wiped film evaporator may output solvent out of a first output, light terpenes out of a second output, cannabinoids out of a third output, and other materials out of a fourth output, for example. Each of these different materials may be associated with evaporation characteristics. For example, each of these different types of materials may evaporate differently given a set of operating temperatures or pressures. In certain instances, some materials may be evaporated when others are not. Furthermore, different substances may be condensed in different zones using combinations of controlled temperatures and pressures. When evaporations and concentrations are being performed within different zones of a separator, for example a multi-effect wiped-film evaporator, each of these different zones may have the same or a similar pressure that could be controlled by a control system and temperatures for each of these different zones may be controlled by the control system to condense certain specific materials. While the separation of many different types of materials have been discussed, methods and apparatus consistent with the present disclosure may separate one material from another at a point in time or may separate one set of materials from another set of materials. Separators consistent with the present disclosure may have two or more outputs or may be cascaded in series. Alternatively or additionally, separators consistent with the present disclosure may sequentially pass materials through one or more pieces of separation equipment when different plant material components are separated from others or from a solvent, for example.

In certain instances, lighter terpenes may be separated from heavier terpenes. In such instances, lighter terpenes may condensate at temperatures that do not condensate cannabinoids. Furthermore, cannabinoids may be condensed at temperatures that do not condensate heavier terpenes and these heavier terpenes may also be condensed in different condensers. As such, each different types of material or set of materials may be condensed in a zone with controlled environmental characterizes. In one embodiment, this process could be achieved by passing the plant materials through the wiped film to separate the essential elements from other pant matter in multiple passes through a single evaporator. This could be achieved using a multi-effect wiped film like those produced commercially by Artisan, Pope Scientific, or Pflauder, for example. These multi-effect wiped film evaporators may be used to separate plant matter essential elements having different molecular weights and evaporation points from each other.

In instances where waste heat from an engine is provided to an evaporator, a fluid (e.g. liquid, vapor, or steam) used to cool an engine may be passed through a heating input at a separator when a separation is performed. Waste heat from the engine could be included in a power budget. In an instance where a particular type of engine-generator is 83% efficient, approximately 17% of the energy burned by that engine could be used to heat an evaporative system. Given an environment where 100 KW of electrical power is continuously provided to an extraction/separation system by a generator with 83% efficiency, fuel with more than 100KW of equivalent energy must be provided to that engine-generator. In an instance where conventional natural gas supplies are provided to an engine-generator, Formula 2 and Formula 3 below may be used to calculate a total amount of fuel energy that must be supplied to meet this 100 KW electrical power at 83% efficiency.

$$\frac{100 \text{ KW}}{0.83} = \text{Fuel Energy Input} = 120.48 \text{ KW} \qquad \text{Formula 2}$$

$$\text{Waste Heat Energy} = \text{Fuel Energy Input} - 100 \text{ KW} = \qquad \text{Formula 3}$$
$$120.48 \text{ KW} - 100 \text{ KW} = 20.48 \text{ KW}$$

Formulas 2 and 3 above indicate that approximately 20.5 KW of waste heat energy would be produced continuously when 100 KW of electrical power were provided to a processing system that used an engine-generator with 83% efficiency. In an instance where this 20.5 KW of continuous power was more than enough to provider thermal energy to heat an evaporator to a desired temperature, only a portion of this thermal energy could be provided to the evaporator when a preferred evaporation temperature is maintained at the evaporator. Excessive waste heat may be dissipated using radiators, fans, or other equipment such that such that a heated fluid may be sufficiently cooled and circulated back to the engine such that an optimal temperature could be maintained at the evaporator and/or engine. Alternatively, when this 20.5 KW of continuous power was not enough to maintain the preferred evaporation temperature, a heater (such as an inductive, a resistive heater, or a gas heater) could heat the fluid provided to the evaporator to maintain the preferred evaporation temperature at the evaporator. In certain instances, a heater could use electricity from a generator or existing power grid.

Continuous power in the form of waste heat from an engine used to power a generator or other equipment may heat any form of liquids or vapors, such as water, oil, antifreeze, glycerin, steam, gas, or other fluid. In such instances, thermal energy may be transferred through direct thermal transfer to provide heat to a separator. Such heat energy may be transferred via a heating jacket or via coils that surround or are incorporated with a vessel. Alternatively or additionally, secondary heaters may heat fluids be heated by the burning of a gas, such as natural-gas.

Other metrics that may be used to design or that may be used to control an extraction/separation system may include a power budget and an operational time span required to process a certain mass or weight of *cannabis* plant matter. For example, given an approximation that to process 400 Kilo-Grams (kg) of *cannabis* plant matter in a 24 hour day would consume approximately 180 KW of power continuously that would result in 4320 KWh of total power consumption during that day. Assuming that the plant matter included about 220 grams of essential elements per kg, then 400 kg of *cannabis* would be expected to produce about 88 kg of *cannabis* essential elements (e.g. cannabinoids and/or plant terpenes). The total amount of power required to separate and extract these essential elements could be calculated by Formula 4. Formula 4 identifies that such a system should consume 49 Watts for every gram of *cannabis* essential elements extracted from this plant matter. Control systems consistent with the present disclosure may monitor masses or volumes of essential elements output from separation apparatus when monitoring the efficiency of an extraction/separation process, for example.

$$\frac{180 \text{ KWh} * 24 \text{ h}}{88 \text{ Kg}} = \frac{4320 \text{ kW}}{88 \text{ Kg}} = \frac{49 \text{ W}}{\text{gram}} \qquad \text{Formula 4}$$

Control systems consistent with the present disclosure may also track the efficiency of an co-generation system containing an engine/generator. Such a control system may receive information regarding electrical voltages and currents that are provided to a system when a total amount of electrical power consumed by system is calculated or measured. Such information may be sensed using any technique known in the art that may include voltage sensors/meters, current sensors, or power meters, for example. These sensors or meters could include or be coupled to shunt resistors, inductive loops, voltage comparators, filter circuits, analog to digital converters, or other devices used to sense or monitor voltage, current, power, or thermal energy transfer. Electrical power consumption, an amount of fuel burned, and/or an amount of heat transferred to particular apparatus may be measured and used by a control system to maintain operation within a power budget. Flow rates, output weights, or volumes of outputted materials may be used to monitor and control the processing of plant materials into concentrates. A volumetric density associated with a cannabinoid, for example may be combined with an identified or measured volume of an essential element output from a separator, the control system could then use this information to calculate or identify an estimated weight or mass of the cannabinoid output from a separator overtime. Similarly, fuel flow sensor data or liquid level sensor data could be used to calculate amounts of fuel burned by the engine.

In one instance, a flow rate of a substance through an orifice can be used to calculate a volume of material passing through the orifice over time that volume may be used to calculate an estimated mass of that substance that passed through the orifice during that time by multiplying the volume by a volumetric density of the substance. In such an instances this flow could be sensed by a sensor when that sensor provides data to a control system. Alternatively a level sensor or an optical sensor could measure a level or volume of a substance in a vessel.

Evaporators consistent with the present disclosure may also include one or more condensation units that cool one or more zones of an evaporator or condenser. Each of these condensation units may be provided a chilled fluid at a controlled temperature that causes a substance in a vapor form to condense. The condensed substance may be collected in a vessel or may be passed through an output at the evaporator. Fluid may be chilled using compressed Freon from an air conditioning pump driven by the engine or turbine. Additional electric chillers may be used to cool a fluid that is provided to a set of chilling coils in a zone of an evaporator, for example. Exemplary electric chillers include recirculating chillers like those marketed under the trade name "ThermoFlex" 7500/10000/15000 by "ThermoFisher" Scientific. An amount of energy consumed by such chillers may be also be included in an energy or power budget.

The present disclosure is directed to methods and systems for electronically controlling the extraction of essential elements from plant matter and/or vaporization/separation/concentration of essential elements in more advanced ways. Extraction systems and separation systems and methods consistent with the present disclosure man include a control system that may be coupled to various different sensors, where the control system may include one or more processors that execute instructions out of one or more memories.

Separation systems consistent with the present disclosure may include sensors that measure weight, mass, flow rate, pressure, temperature, or moisture or other chemical, for example. In certain instances a gas chromatograph or other apparatus may be coupled to a control system that monitors what chemicals are present at a particular location in an extraction/separation system. For example, a chemical monitoring device may receive samples from an extractor during an evaporation process where clean solvent is provided to that extractor as cannabinoid containing eluate samples are tested over time. In such an instance, when a cannabinoid content contained within an eluate sample reaches or crosses a threshold, a determination may be made that an extraction is complete. The testing of the eluate sample may identify a mass of cannabinoids in a volume of an eluate. When a mass of cannabinoids included in the volume of eluate, is identified as being below a threshold level of the sample eluate volume, a plant matter extraction may be identified as being incomplete. As such, a volumetric density of cannabinoids in the sample volume may be associated with a time when the plant matter extraction is complete. At this point in time any remaining solvent/eluate remaining in the extractor may be processed and then a drying process may be initiated at the extractor. Controls systems consistent with the present disclosure may be used to control a variety of separation systems, where each type of control system may be configured or constructed in ways that optimize the performance of a particular type of material separation whether a separation system is coupled directly to an extraction system or not. Alternatively apparatus and methods consistent with the present disclosure may receive essential elements that were previously extracted. For example, concentrates created by a $CO_2$ extractor may be provided to an input where solvent is combined with a $CO_2$ extract in controlled ways. In such an instance, a control system may monitor the temperature or viscosity of an extract combined with a solvent when controlling flow rate that is provided to a separation system.

FIG. 1 illustrates a wiped film evaporation system consistent with the present disclosure. Note that such evaporation systems, depending on a particular implementation, may be positioned in a vertical, partially vertical, or horizontal orientation. FIG. 1 include evaporator 100. Extraction system 100 includes an extraction vessel 110, an input vessel 105, a heating jacket 120, heating input 120A, heating output 120B, chilled unit 130, chilled unit inputs/outputs 130A/130B, wipers W, rotation motor 140, bottoms collector 150, output collection vessel 160 (coupled to the extraction unit via an output), a series of secondary apparatus (including items 170, 175, 180, 185, 190, & 195), and vacuum pump 196. Chiller 130CH may circulate a cooling fluid through chilled unit 130 via chilled input outputs 130A/130B.

Sensors may be disposed throughout different portions of extraction system 100. For example one sensor may sense a level of material included in input vessel 105. Another sensor may sense a flow rate of material as that material flows from input vessel 105 into extraction vessel 110. Other sensors coupled to input vessel 105 may be configured to sense a density of the material included in input vessel 105. While not illustrated in FIG. 1, material from input vessel 105 may be pumped into extraction vessel 110 at a controlled rate, may flow with the assistance of a pressure, a vacuum pressure, or may be controlled by valves or an orifice size. Input vessel 105 may be a storage tank or may be part of an extraction system or may be part of a system that controllably feeds materials to evaporator 100. Input vessel 105 may be an extractor consistent with extractors described in respect to the various patents and patent applications that are incorporated by reference into the present disclosure. Alternatively input vessel may receive extracts that have been previously produced by various means. As in the example mentioned above in respect to an extract produced using $CO_2$, such previously extracted materials could be controllably provided to extractor 100 by a control system that controls a temperature or that controllably combines that extract with a solvent. In such an instance a flow rate into evaporator 100 could be monitored using a sensor coupled to the control system.

In certain instances the density of the input material may be measured by an independent process, such as a person measuring the weight of a volume of a sample and inputting that measure into a user interface of a computer. Alternatively, a sample of input material may be analyzed using a laboratory equipment, such as a high performance liquid chromatograph (HPLC), a gas chromatograph, an optical chromatograph, or other test devices. This could be done dynamically over time using automatic or manual operations.

As matter is input into extraction vessel 100, a portion of that may be evaporated using a controlled temperature. The temperature of the extraction vessel may be monitored by one or more temperature sensors coupled to or near an inside portion of extraction vessel 110. Furthermore vacuum or vacuum/pressure sensors may be included distributed throughout the inside portion of extraction vessel 110. In certain instances heated fluid, liquid, vapor, or steam may be introduced into heating jacket 120 through heating input 120A and be output through heating output 120B. In such instances, temperature sensors may measure the temperature of liquid/vapor/steam input into input 120A and may measure the temperature of liquid/vapor/steam output from output 120B. A difference in temperature may be monitored by a processor executing instructions out of a memory as the processor evaluates heat transfer that is occurring within vessel 110. In instances where that processor identifies that the heat difference between a temperature associated with input 120A and output 120B is above a threshold level, the processor may initiate a corrective action. Corrective actions in such an instance may include, changing an input flow rate of the material from vessel 105, changing an amount of energy input into input 120A, or changing a rotational velocity of motor 140. Since motor 140 is coupled to wipers W, a slowing of motor 140 will slow down how fast wipers W rotate in extractor 100.

Temperature sensors associated with chilled unit 130 may also measure one or more temperatures of chilled unit 130. Such sensors may be coupled directly to unit 130. Temperature sensors may be coupled to chilled unit inputs/outputs 130A/130B, and the processor executing instructions out of the memory may monitor how much an input temperature associated with input 130A is different from an output temperature associated with output 130B.

Temperature differences associated with the heating of the heating jacket 120 and the cooling of the chilled unit 130 may be monitored by the processor when that processor identifies whether the extraction system is operating in a manner consistent with an evaporation protocol. Such a protocol may have been developed experimentally, by inputting input matter of a certain density with different flow rates, with different temperature inputs, with different chilled input temperatures, and by monitoring temperature differences associated with both heating input/outputs 120A/120B and with chilled inputs/outputs 130A/130B. One or more thresholds may be associated with efficient or desired evaporation rates, in certain instances such heating temperatures or chilled temperatures may be associated with one or more good accepted temperature difference thresholds. In other instances other sets of thresholds may be associated with bad or undesired differences in heating or chilled input output temperatures. As such, a certain (first threshold) amount of temperature drop between input 120A and output 120B may correspond to a desired heat transfer load or operating condition associated with a concentration. Similarly, another threshold may be associated with a temperature increase of chilled input 130A and chilled output 130B that may correspond to the desired or another a desired heat transfer load or operation condition associated with the concentration.

Undesired thresholds associated with the present disclosure may be associated with too much of a temperature change between input 120A and 120B or between input 130A and 130B. Here again if an undesired condition is observed, an input rate, a rotational speed, a input heat temperature, or input chilled temperature, or other factor may be adjusted. Evaporations consistent with the present disclosure may be coupled to a profile related to heating temperature, heat/temperature input via input 120A, heat/temperature output via output 120B, where a processor executing instructions out of a memory may change any one of the aforementioned factors.

Alternatively or additionally, the processor executing instructions out of the memory may identify that the temperature difference associated with input 120A and output 120B or input 130 and output 130B that is too little, after which input flow rates or rotational speeds or other factors may be adjusted.

A cooling liquid may be to chilled unit 130 via chilled input 130A and chilled output 130B, this cooling liquid may be coupled to a chiller that recirculates antifreeze, for example. Alternatively, chilled unit 130 may be coupled to refrigerant source (such as an R-600a or R-290 fluid that is considered non-ozone depleting refrigerants) that is coupled to a compressor that is recirculated through chilled unit 130. One or more such compressors may be cascaded and may include a compressor coupled to an engine of a vehicle. Alternatively or additionally heating jacket 120 may be heated using electrical heaters, inductive heaters, and/or be heated by another heat source, such as a co-generator that extracts heat from an engine or other source.

Bottoms collector 150 may receive heavier elements that were included in vessel 105. These heavier elements may not evaporate at temperatures provided to heating jacket 120. Sensor associated with bottoms collector 150 include a temperature sensor, a flow rate sensor, a pressure sensor, a revolutions sensor (used to measure revolutions per second or minute), or a level sensor. In certain instances the weight of bottoms collector may be monitored and a processor executing instructions out of a memory may monitor the weight of bottoms collector 150 (via a sale or strain gauge) when calculating an estimated flow rate or an estimated volumetric rate of change associated with matter included in bottoms collector 150. While not depicted in FIG. 1, bottoms collector may be flexibly connected to vessel 110, such that a weight associated with bottoms collector may be monitored without worry of connecting tubes/hoses/pipes limiting the effectiveness of such a weight monitoring system. When input vessel 105 provides elements associated with the *cannabis* plant, for example, bottoms collector may collect waxes and other heavier elements associated with the *cannabis* plant as solvent, cannabinoids, or possibly terpenes are evaporated in evaporator 100.

Chilled unit 130 may cause certain elements, such as cannabinoids to condense and be deposited into collection vessel 160. One or more sensors may be included in or coupled to collection vessel 160 such as sensors that sense factors, such as temperatures, pressures, levels, flow rates, or weights associated with collection vessel 160. A processor executing instructions out of a memory may be used to monitor and temperatures associated with heating jacket 120 or with chilled unit 130 when optimizing the collection of targeted elements in collection vessel 160. Temperatures and pressures associated with collection vessel 160 may be optimized for condensing cannabinoids and that leave solvent or terpenes escape into secondary apparatus 170. Secondary apparatus 170/175, 180/185, and 190/195 may also include sensors that sense factors, such as temperatures, pressures, levels, flow rates, or weights associated with a respective collection vessel 175, 185, 195, for example.

Pressure and temperature sensors that monitor factors associated with each respective apparatus. Control systems consistent with these secondary apparatus may also be used to control temperatures and pressures for condensing certain elements and for evaporating other elements. Secondary apparatus 170 may be used to condense terpenes into apparatus/vessel 175 and secondary apparatus 180 to condense solvent into apparatus/vessel 185. Furthermore any number of secondary apparatus may be coupled to an extraction system, where each respective secondary apparatus may be used to collect a targeted element under computer or control system control. Each of the factors discussed herein may be controlled according to a profile that may extract and/or separate elements as desired. In certain instances, such extraction and evaporation/separation/concentration systems may be observed and/or controlled from a remote computing device.

While FIG. 1 illustrates a single vacuum pump 196, evaporation systems may include any number of vacuum pumps. Vacuum pumps may be coupled to the inside of extraction vessel 110, collection vessel 160, or secondary apparatus 170/175, 180/185, and 190/195. Vacuum pumps may be used to control pressure differences between one part of an extraction system and another in order to maintain pressure difference gradients from one vessel to another. Vessel 160 or apparatus 170/175, 180/185, and 190/195 may also include or be attached to heating or chilling elements that maintain different temperatures in different zones of an evaporation/condensation system consistent with the present disclosure.

In certain instances, the output of one chiller may be passed to the input of another chiller. As such the cooling capacity of different chillers may be cascaded or combined. Alternatively or additionally condensation units may be cascaded. In such instances, a first condensation unit receives coolant at a first temperature when a first substance is condensed and a second condensation unit receives a coolant at a second temperature when a second substance is condensed. For example secondary apparatus 170/175, 180/185, and 190/195 may be condensation units that pass a coolant from one apparatus to another in series. Furthermore, example secondary apparatus 170/175, 180/185, and 190/195 may include secondary chiller or heaters that may be used to optimize coolant temperatures in respective apparatus when a manufacturing process is controlled.

Furthermore, materials evaporated into a vapor in a first evaporator may be passed to a heating jacket of a second evaporator. In such an instance, the heating jacket of the second evaporator may cool the vapor created by the first evaporator, this cooled vapor could then be provided to a condenser that is chilled to a temperature that condenses one substance and not another substance included in the vapor. For example, a cannabinoid may be condensed at the condenser associated with the second evaporator and a solvent and possibly other materials in vapor form could be passed to yet another apparatus where either liquid solvent or other materials are condensed. Here again, the solvent vapor may be coupled to the heating jacket of a third evaporator and another condenser where terpenes are condensed. As such, evaporators or other separators or condensers may be cascaded when different essential elements are collected in different places of a separation system. Separators consistent with the present disclosure may be configured to isolate cannabinoids, terpenes, solvent, water, or even other plant materials or contaminants (such as waxes, chlorophyll, sugars, or salts). In certain instances, as reviewed above, some heavier materials may be separated from lighter materials by evaporating the light materials and not the heavier materials.

Figure 2:
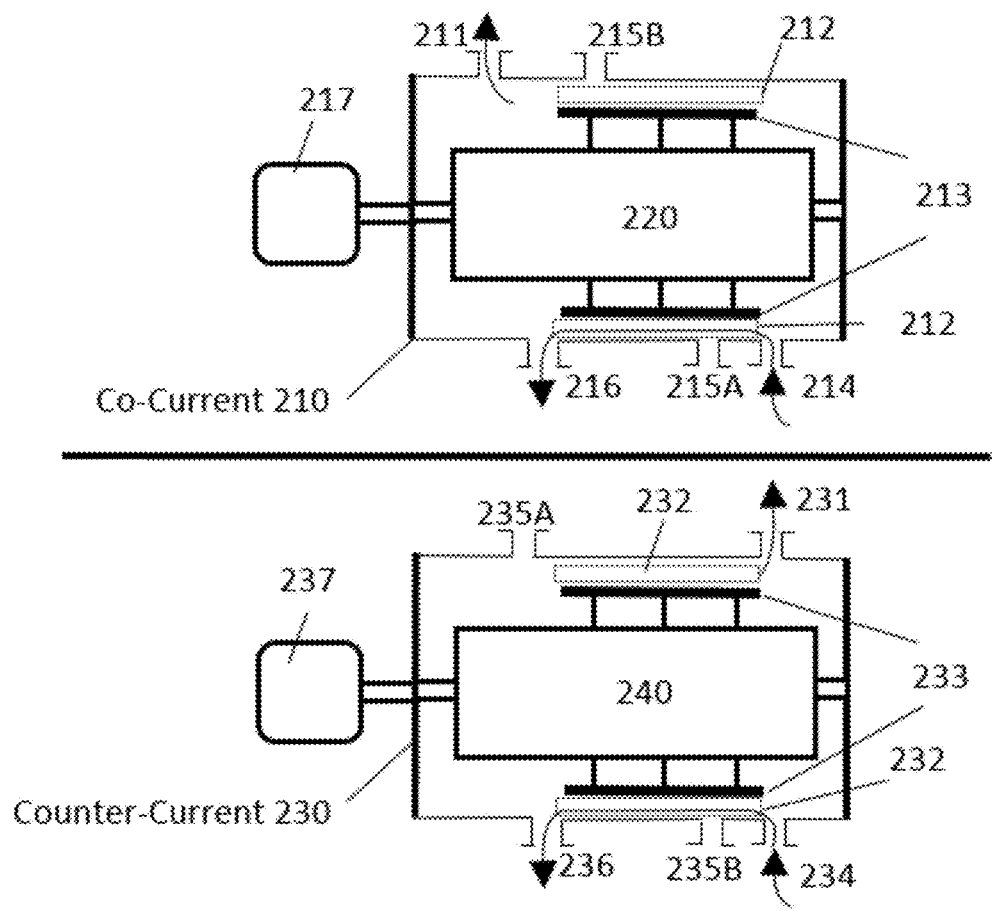
FIG. 2 illustrates a horizontal wiped film evaporation system operated in both a co-current configuration and in a counter-current configuration.

FIG. 2 illustrates a horizontal wiped film evaporation system operated in both a co-current configuration and in a counter-current configuration. In the co-current configuration 210 an evaporated portion flows in the same direction as non-evaporated bottom elements. In this co-current configuration, material flows into port 214, heavier bottoms elements flow out of port 216, and lighter evaporated elements flow out of port 211. Note that both port 216 and port 211 are both to the left of port 214, this indicates that the flow of the evaporated elements and the non-evaporated elements flow in a same direction (from right to left). Note that the co-current configuration 210 includes motor 7, rotational element 220, wipers 213, process wall area 212, and ports 215A/B that are heater inputs or outputs. As a flow flows into port 214 as indicated by the arrow associated with port 214, a heating substance may flow into port 215A and out of port 215B (for example). Wiper elements 213 may be rotated by motor 217 and rotational element 220 as the wiper elements 213 rub process wall area 212 when an evaporation is performed on a portion of the materials input through port 214.

FIG. 2 also includes a counter current configuration where the evaporated portion flows in one direction where the bottoms flow in another direction. Note that counter-current configuration 230 also includes a motor 237, a rotational element 240, wipers 233, process wall area 232, heater inputs/outputs 235A/B, material input port 234, evaporation output port 231, and bottoms output port 236. Here again materials may be input into an port 234, bottoms may be output out of an output port 236, when heater input/output ports 235A/B receive and output a heated substance. At this time motor 237 will rotate rotational element 240 as wipers 233 wipe wall area 232 when material is input through port 234. This counter-current configuration 230 passes evaporated portions out of port 231 and outputs non-evaporated bottoms elements out of port 236. Here, however, material flows out of port 231 in a direction that is (left to right) different from the flow of elements that pass out of bottoms port 236 (right to left).

The wiped film evaporators of FIG. 2 may include many similar elements and sensors as those described in respect to FIG. 1. Items 217 and 237 are motors that may be used to rotate rotor blades and associated wipers. Here again a control system that monitors sensor data may be used to control the operation of a wiped film evaporator (210 or 230), for example. As such, one or more additional apparatus may be coupled to an evaporator. In certain instances, a co-current evaporator configuration 210 could be coupled to a counter-current evaporator configuration 230 (or visa-versa). In such instances the co-current evaporator configuration 210 may be optimized for a first concentration level followed by the counter-current evaporator configuration 230 that is optimized for concentrating certain elements, for example.

Figure 3:
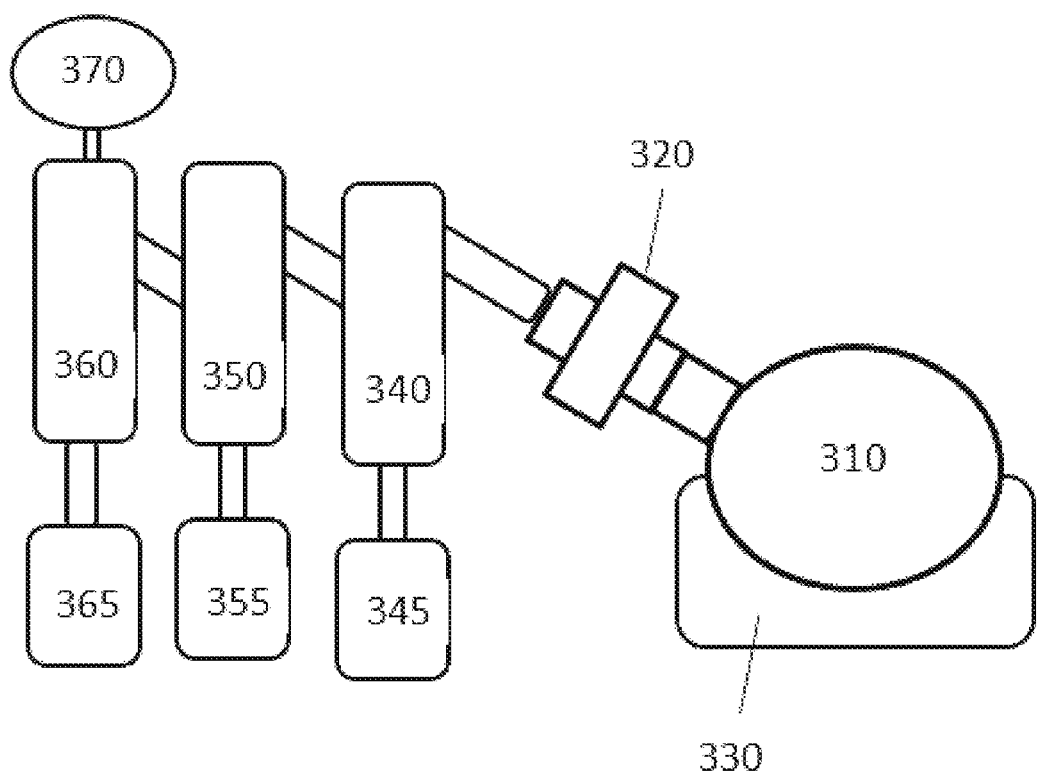
FIG. 3 illustrates a rotary evaporation system.

FIG. 3 illustrates a rotary evaporation system. The rotary evaporation system of FIG. 3 includes flask 310, rotational element/motor 320, heating element 330, secondary apparatus (340/345, 350/355, and 360/365), and vacuum pump 370. The rotary evaporator of FIG. 3 may include any of the sensors, vacuum pumps, or other items discussed in respect to the evaporator of FIG. 1. Secondary apparatus 340/345, 350/355, and 360/365 may be controlled by a computer to collect targeted elements based on condensation temperatures and controlled temperatures in each of apparatus 340, 350, and 360. Here again the computer may control heating or cooling of any respective element (330, 340/345, 350/355, or 360/365). Vacuum pressures temperatures, pressure gradients, or temperature gradients may be monitored based on sensor data and controlled by a control system when performing evaporations and when making concentrates.

Figure 4:
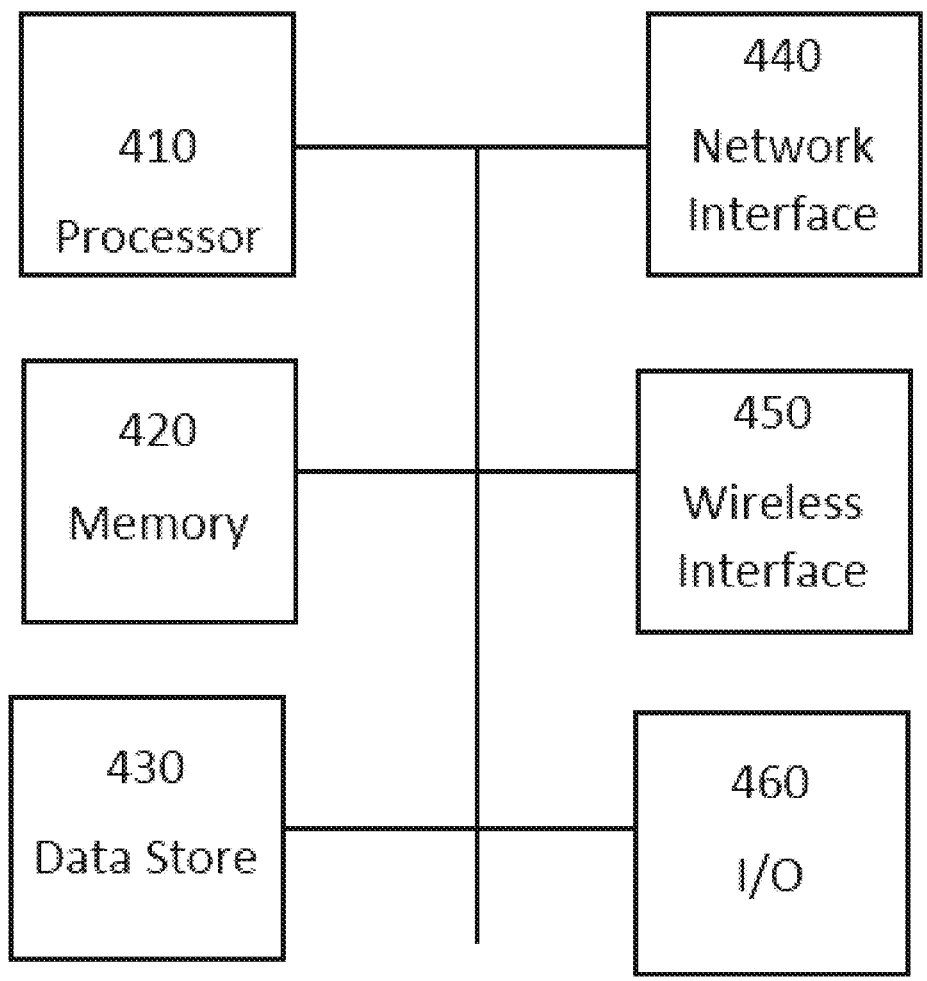
FIG. 4 illustrates a control system that may be used to control extraction and evaporation/concentration systems and methods consistent with the present disclosure.

FIG. 4 illustrates a control system that may be used to control extraction and evaporation/concentration systems and methods consistent with the present disclosure. FIG. 4 includes processor 410 that may execute instructions out of memory 420. FIG. 4 also include mass data store 430, network interface 440, wireless communication interface 450, and input/outputs (I/O) 460. Processor 410 may receive information from sensors via network interface 440, via wireless communication interface 440, or from I/O 460 when monitoring actions performed by an extraction and/or an evaporation/concentration system.

The control system of FIG. 4 may reside with evaporation or extraction apparatus, may be remote from such systems, or may include one or more computing devices. In certain systems computing devices such as a desktop, notebook, tablet, or cell phone computing device may be used to control or adjust the control of extraction or evaporation/concentration systems at a remote location. In such instances network interface or wireless communication interface may communicate with a remote computing device. A remote computing device consistent with the present disclosure may display a user interface where sensor data may be observed or that may be used to control the operation of systems consistent with the present disclosure. Such a user interface may be used to control a motor, a rotational speed, vacuum pressures, vacuum pumps, valves, flow rates, or to shut down an extraction or evaporation/separation/concentration system consistent with the present disclosure. Wired network connections may include any standard wired network known in the art (Ethernet for example). Wireless communications may include communication signals consistent with cell phones, with 802.11 Wi-Fi, Bluetooth, radio, or other wireless communication mediums.

In another embodiment, the control system may be located separately from the extraction or evaporation/concentration system and accessed over an Ethernet connection, wireless network, cell phone link, radio link, or other form of network connection. In such embodiments, a cloud of computing devices may be virtually associated with a extraction or separations system when this system is controlled remotely. Remote control may be facilitated by a user interface at a remote user device that provides control inputs to a control system located at an extraction site.

Extraction systems consistent with the present disclosure may extract essential elements from plant matter. In certain instances extractions may be performed on previously dried plant matter, in other instances extractions may be performed on freshly cut down plant matter that still contains water. Liquid or eluate from a hopper may be passed through a separator, such as a rotary evaporator, a thin film film/wet film evaporator, other evaporator (as discussed herein), or a membrane separation apparatus. The purpose of the separator may include removing or isolating *cannabis* plant matter essential elements, such as cannabinoids, flavonoids, or terpenes from the liquid/eluate.

A solvent trap consistent with the present disclosure may be a Wolfe bottle, may include a chilled condenser, or may include an element through which a cooling liquid is pumped from a chiller. A sensor coupled to a processor may be used to monitor an amount of solvent vapor in a vessel/hopper that contains solvent saturated plant matter. In such an instance, when sensor data indicates that an amount of solvent vapor is below a threshold solvent vapor threshold level, the plant matter may be identified as being "dry" or "dry enough," indicating that a drying process is complete. As such, solvent may be removed from plant matter after an extraction and recovered for future use.

Pressures greater than the auto-ignition of a solvent in certain conditions may be avoided. For example, if hexane has an auto-ignition pressure with sufficient oxygen of 50 pounds per square inch (psi), pressures in a vessel associated with the apparatus may be limited to less than 50 psi by the control system. Furthermore, an alarm may be issued if pressure in a particular portion of an extractor or separator increases above a threshold level. In certain instances when a pressure of concern is approached or reached, a computer or control system coupled to a sensor may command one or more valves to open or close. Such precautions could prevent the possibility of solvent rich pressurized gasses leaking from a vessel approaching conditions where auto-ignition or other concerns related to the solvent could occur. Here the pressure could be vented into the atmosphere or into another container via a pressure relieve valve.

Extraction systems may be primed in a manner consistent with U.S. Pat. No. 8,343,553 (U.S. patent application Ser. No. 13/066,585 and U.S. patent application publication 2012/0263804), U.S. Pat. No. 9,358,259 (U.S. patent application Ser. No. 13/506,010, U.S. patent publication 2013/0251824, and patent publication 2016/0279183) U.S. Pat. No. 9,155,767 (application Ser. No. 14/880,260, patent publication 2014/0113010, and patent publication 2016/0074450). These patents involve extraction systems and methods that extract essential elements from *cannabis* plant matter after a hopper has been filled with *cannabis* plant matter. U.S. Pat. No. 9,155,767 (U.S. patent application Ser. No. 14/880,260, U.S. patent application publication 2016/0074450) describe evaporation systems that may be coupled to an extraction system.

Vacuum may be used to remove air or oxygen from a vessel and later a gas (such as nitrogen) could be supplied introduced into the vessel when an extraction is performed. In alternate embodiments vacuum pumps, a vessel/hopper, a solvent tank, secondary tanks, solvent traps, and a supply of gas may be controllably connected with valves. In certain instances such valves may be manually controllable or they may be controlled by a control system. Automated valves may be controlled pneumatically, hydraulically, or they could be electrically actuated. In certain instances, check valves may opened by a vacuum pressure when an extraction vessel is primed with solvent. Such check valves may also be forced closed when pressurized gas is provided to the vessel. While gasses that do not include oxygen may be preferred, air may be used is apparatus consistent with the present disclosure as desired.

High Capacity Evaporation Apparatus and Methods: An extraction apparatus may be coupled to one or more separators, such as a high efficiency evaporator such as a rotary evaporator, a thin film/wiped film evaporator, a short path wiped film evaporator, a falling film evaporator, or another type of evaporator. Alternatively or additionally the extraction apparatus may be coupled to a membrane separator. Extraction apparatus and separators may be built on one or more frame or skid assemblies (a frame assembly) such that the extraction apparatus and the separators may be lifted by a forklift or crane onto a vehicle or trailer where they may be delivered to a destination where an extraction and/or separation process may be performed.

The extraction apparatus and the high efficiency evaporator may be coupled to a generator. The generator may also be mounted on a vehicle or trailer. The generator may be capable of providing 3 phase power of any desired voltage. For example the generator may provide 208V/220V or 440V/480V phase to phase, for example. Apparatus consistent with the present disclosure may be configured to receive power from a power line that may provide enough electrical power to power extraction and/or separation processes even when an engine-generator is not used. In such an instance standard NEMA connectors may be used. Electrical power could be provided to power heaters that heat materials flowing into a separator under control of the control system.

Even when power is received from an external power source, such as a utility grid, an engine-generator may be also run to provide a portion of electrical power required to run particular processes as waste heat from the engine may be used to provide thermal energy/heat to a separation system. A control system could monitor heat transfer to heat a fluid that provides heat to a separator. In such an instance the fluid, water, or steam could be used to controllably heat eluate to a desired temperature when a separation is performed. Alternatively the waste heat and/or electrical power may be used to controllably heat other substances, such as an oil or glycerin that transfers heat to evaporate solvent from the eluate.

One side of the high efficiency evaporator may be coupled to a vacuum pump that lowers operating pressures inside of the evaporator. In such instances a gas, such as a dry inert gas (like nitrogen) may be help push eluate from the extractor, an eluate storage tank, or hopper into a separator. As such, a pressure differential between the evaporator and the eluate source helps push and/or pull eluate into the separator. Alternatively or additionally, eluate may be pumped into the separator from an eluate source using a solvent pump or be gravity fed. Solvent pumps (including, yet not limited to peristaltic pumps, progressive cavity pumps, chopper pumps, disc pumps like i.e. a "Discflo" pump, or centrifugal pumps) may be any pump capable of pumping liquid solvent.

Filters may be disposed between the eluate source and a high efficiency evaporator. While 100 micron filters may be used, other filter sizes may be selected or cascaded in stages (100 micron, 50 micron, 10 micron, and 2 micron) to achieve high flow rates while providing a capacity to remove substances above a certain size. Common mold, such as botrytis and white powdery mildew can be removed using a filter of an appropriate size. Cascaded filters could filter the eluate in a series of steps. Alternatively a filter with a single preferred size may be used. In certain instances, a filter may be large or a plurality of filters may be arranged in parallel such that a preferred eluate flow rate may be provided to a separator. As such, filters may be provided in various configurations such as a single filter, or filters in serial or parallel configurations.

Sensors coupled to a control system may be used to monitor flow rates, solvent removal rates, pressures, and/or pressure differentials. The processor executing instructions out of a memory may control flow rates, gas pressures, and vacuum pressures when optimizing solvent removal rates. Other factors may be monitored by the sensors and the processor including, yet not limited to condensate weight, condensate temperature, condensate temperature when exiting the extractor, solvent concentration levels in previously extracted plant matter, or heating jacket temperature.

Membrane separators may be used in certain instances. Such membrane separators may prevent substances with certain characteristics to pass through the membrane while allowing other substances with other characteristics to be output through an output without these other substances passing through the membrane. Such membrane separators may require a power input that receives an electrical or thermal power when a filtering process is performed, such a separator may operate using a pervaporation technique. Pervaporation is a process where substances are either passed through a membrane or not based on whether those substances are in at least a partial vaporization of particular substances. Pervaporation processes may include providing a liquid feed stream heated to a controlled temperature that is routed to a membrane, where a substances is vaporized as it passed through a membrane. This process may dissipate heat included in the liquid feed stream, as such, additional heat may need to be provided during this process. Saturated vapor may pass through a pervaporation membrane according to a partial pressure that may be associated with a substance. Other substances that are not in at least a partial vapor state may be rejected by the filter. Flow rates of substances that pass through such a membrane and that do not pass through that membrane may be monitored by a control system consistent with the present disclosure. Furthermore, such a control system may provide heat via electrical heaters or by transferring thermal energy to maintain operation of a system according to a protocol. A control system may also receive sensor data that associated with temperatures or pressures and such a control system may control temperatures or pressures associated with an input or an output of a pervaporation system. Any power required by a membrane separation apparatus may be associated with a metric or parameter in a power budget. Such power metrics may identify measures of electrical power or a measures of thermal energy that may be derived in whole or in part by a co-generation system.

In certain instances a membrane separation system or an evaporative separation system may include multiple stages that have different inputs and outputs that may be arranged in series of different physical apparatus. In an example, a membrane separation system may include a first membrane that outputs a first substance and that passes one or more other substances, a second membrane that filters the other substances by outputting a second substance and by passing a third substance. Such systems could have a cumulative power budget including power or energy requirements for each stage of separation system. In other instances, a single piece of physical apparatus may be reconfigured to operate according to different constraints depending on the material input into that piece of apparatus at a given time.

Methods and apparatus consistent with the present disclosure may include both membrane and evaporative separation apparatus that are connected in any desired configuration. For example, a membrane that output solvent mixed with water out of an output could be coupled to an evaporator that purified the solvent by evaporating and condensing the solvent. Cannabinoids output from one form of separator may be supplied to another form of separator. In another example, cannabinoids output by an evaporator may be fed into a membrane separator (or visa-versa) when separating one cannabinoid type from another cannabinoid type or other substances. For example such separators could separate cannabidiol (CBD) and tetrahydrocannabinol (THC), THC and cannabinol (CBN), cannabigerol (CBG) may be separated from other cannabinoids, or terpenes (light or heavy).

Figure 5:
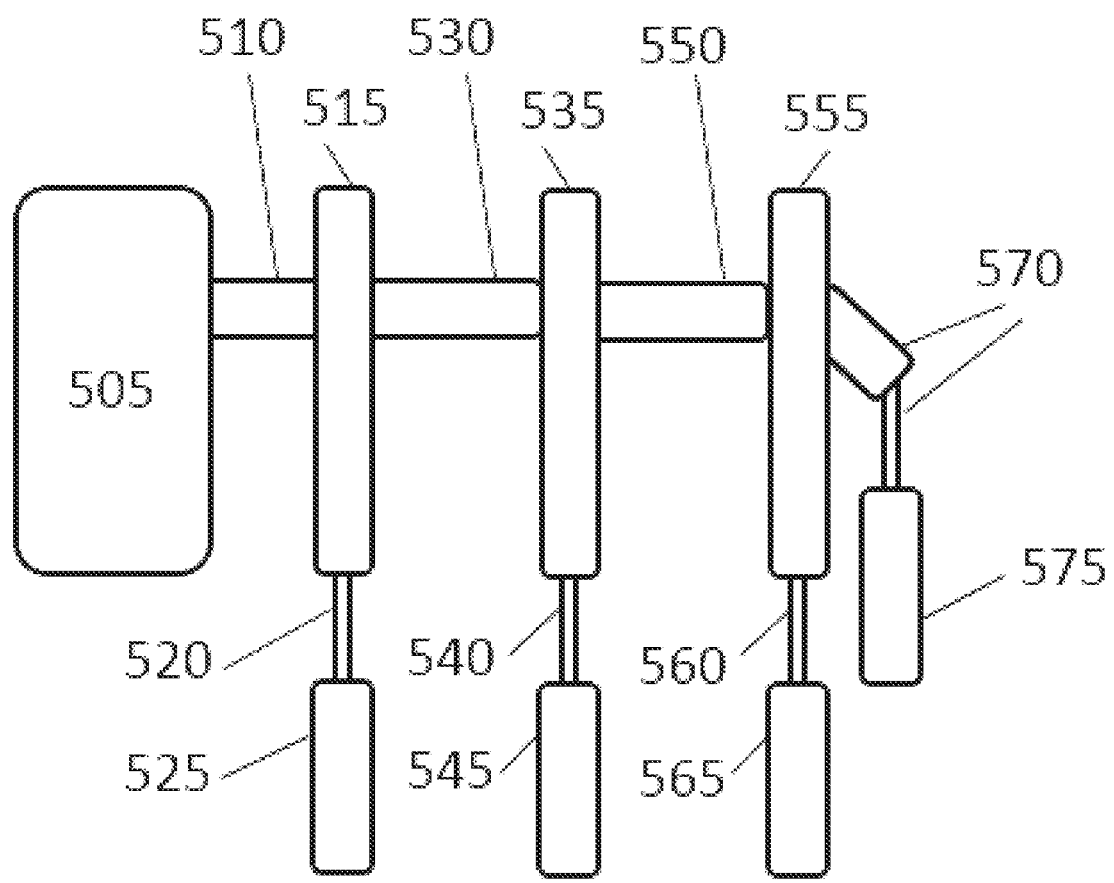
FIG. 5 illustrates an exemplary extractor coupled to a series of other separators.

FIG. 5 illustrates an exemplary separator coupled to a series of other separators. FIG. 5 includes separator 505 coupled to another separator 515 via output 510 of separator 505.

Separator 515 also has output 520 coupled to vessel/apparatus 525 and output 530 coupled to separator 535. Separator 535 has output 540 coupled to vessel/apparatus 545 and output 550 coupled to separator 555. Separator 555 has output 570 coupled to vessel/apparatus 575 and output 560 that is coupled to vessel/apparatus. Separators 515, 535, and 555 may be any form of apparatus configured to separate at least one material from at least on other material. As such, separator 515, 535, and 555 may be evaporative separators, membrane separators, filters, density separators, layer separators, or combinations of different types of separators.

In FIG. 5, outputs 520, 540, 560, and 575 are respectively coupled to items 525, 545, 565, and 575 that may be a vessel or another apparatus. In certain instances, one or more of items 525, 545, 565, or 575 may be additional separation apparatus. For example, if separator 515 were a membrane filter that passed a mixture of cannabinoids, solvent, and water through output 530 and that output a mixture of terpenes derived during a *cannabis* plant extraction through output 520, item 525 could be an additional separator that separates one type of terpene from another type of terpene in the mixture of terpenes. In such an instance, item 525 could include multiple outputs. Separator 535 could then separate cannabinoids and a mixture of solvent and water. In such an instance, the mixture of solvent and water could be output out of output 540 and item 545 could separate solvent and water from the mixture of solvent and water. The cannabinoids may be then output via output 550 into separator 555. Separator 555 could then output a first cannabinoid out of output 560 and pass a second cannabinoid out of output 570. In instances where items 565 and 575 were vessels, these vessels could be filled with the first and the second cannabinoid respectively. In instances where either of items 565 or 575 were separators, additional separations could be performed, for example, if item 575 were a separator and if matter provided to item 575 included the second and a third cannabinoid, item 575 could output the second and the third cannabinoid out of outputs associated with item 575, even though those outputs are not illustrated in FIG. 5.

The different items illustrated in FIG. 5 could include sensors that measure weight, mass, flow rate, pressure, temperature, liquid level, or moisture content. For example extractor 505 could include a level sensor that measures a solvent level, a temperature sensor that measure pressure, or a pressure sensor that measures vacuum or pressure within the extractor 505. Sensors could also be coupled to outputs 510, 520, 540, 550, 560, or 570 that could measure any critical parameter (temperature, flow rate, pressure, or vacuum). Furthermore, sensors coupled to items 525, 545, 565, or 575 that sense a weight, a level, or a mass of material that may have been deposited in these items are vessels.

Figure 6:
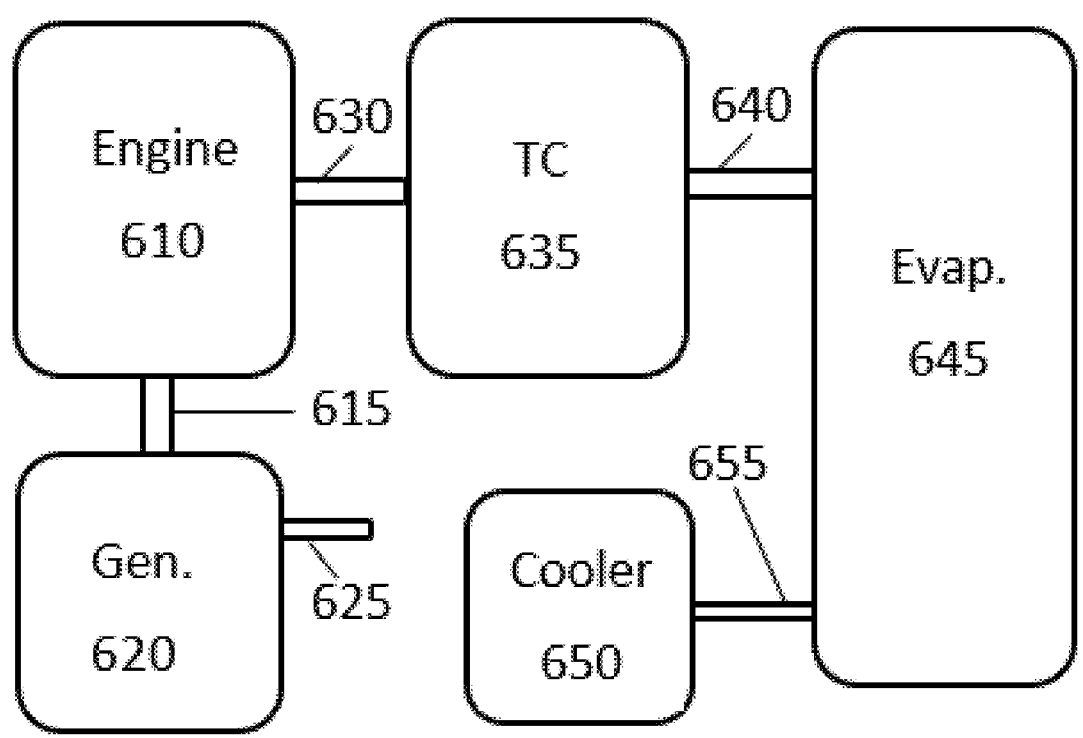
FIG. 6 illustrates an exemplary co-generation system consistent with the present disclosure.

FIG. 6 illustrates an exemplary co-generation system consistent with the present disclosure. FIG. 6 includes engine 610, coupling 615, generator 620, power output 625, heat output 630, temperature controller 635, controlled heat pathway 640, evaporator 645, cooler 650, and cooler pathway 655. In operation engine 610 can drive generator 620 using coupling 615. Coupling 615 may be some form of a drive shaft, a drive belt, chain drive, gear drive system, or other system that causes generator 620 to provide electrical power to power output 625.

Engine 610 is coupled to temperature controller 635 via heat output 630. Heat output 630 may include several pipes, one pipe that provides a cooling liquid to engine 610 and a second pipe that may provide heat energy to temperature controller 635. Temperature controller 635 may be part of a closed loop heat exchanging system that extracts waste heat from engine 610 and that provides a controlled amount of thermal energy to evaporator 645 via controlled heat pathway 640. As such a fluid may be passed between temperature controller 635 and engine 610 that extracts heat from engine 610. Temperature controller may also include a heating or cooling apparatus that may be used to provide cooling fluid to engine 610 and that may provide a heated fluid to evaporator 645. Such heating or cooling apparatus may include radiators, fans, electric heaters, gas heaters, or other means capable of transferring thermal energy. In certain instances temperature controller 635 may be coupled to cooler 650 as part of a heat exchange system/apparatus. When temperature controller provides a controlled heated fluid to evaporator 645 via controlled heat pathway 640, heat pathway 640 may also include several pipes, one pipe that provides the heated substance to evaporator 645 and another pipe that returns the substance to temperature controller 635 or engine 610 as part of the co-generation system of FIG. 6. Cooler 650 may provide a cooling fluid to evaporator 645 via cooler pathway 655. Cooler pathway 645 may also include multiple pipes that allow coolant to circulate between cooler 650 and evaporator 645.

The co-generation system of FIG. 6 may be implemented as part of a vehicle. Engine 610 could be coupled to a high performance vehicle engine that uses a power take off mechanism to generate electrical energy via coupling 615 and generator 620. Electrical energy may be provided to power portions of cooler 650, temperature controller, or both. In such an instance cooler 650 could be a vehicle air conditioner, a vehicle refrigeration unit, or be a laboratory chiller. Heaters included in temperature controller 635 may be any form of heater, for example, an electrical heater or a gas powered heater (e.g. an in-line heater that heats water by burning natural gas).

Alternatively or additionally, cooler 650 and temperature controller 635 could receive power from a mechanical coupling. For example, cooler 650 could be configured like an air conditioning compressor of a vehicle driven by a belt or other mechanical linkage. Furthermore, fluids used to cool the engine 610 of a vehicle could provide waste heat energy to evaporator 645 in controlled ways that is balanced with cooling conditions provided by cooler 650.

Despite a particular implementation sensors coupled to one or more computing devices may be used to control continuous operation of a co-generation system consistent with the present disclosure. For example, the computer system of FIG. 4 could collect data from sensors coupled to any of the apparatus illustrated in the figures of the present disclosure. In respect to FIG. 6, one or more computing devices could collect data relating to a engine fluid input temperature, an engine fluid output temperature, an evaporator heater fluid input temperature, an evaporator heater fluid output temperature, an evaporator cooler fluid input temperature, and an evaporator cooler fluid output temperature. These various temperatures could be monitored and controlled by a computing device by varying amount of heat exchange between the engine 610, temperature controller 635, evaporator 645, and cooler 650 as an evaporation is performed. In such an instance, sensor data relating to internal temperatures and pressures within one or more zones of evaporator 645 may also be monitored or controlled. The flow of materials input and output from evaporator 645 may also be monitored or controlled. As such, a control system could control the flow of an eluate from a plant extractor to evaporator 645 while heating, cooling, and pressure are controlled such that one more separations are performed within an energy or power budget. The use of waste heat from engine 610 can help improve the overall efficiency of an extraction/separation system consistent with the present disclosure.

In another example, a control system could limit the flow of an eluate to an evaporator when an evaporation temperature or pressure began to raise instead of increasing an amount of power provided to chiller a vacuum pump coupled to the evaporator when the system was consuming power at or above a threshold level. The reduction in eluate flow, could result in maintaining an evaporation at preferred operating point without increasing an amount of electrical power provided to the systems. Alternatively, when a system is operating at a power level that is below the power budget and when an evaporation temperature or pressure begins to raise, the control system may raise an amount of power provided to a chiller or a vacuum pump instead of limiting the eluate flow to the evaporator. Note that an amount of power provided to a chiller or vacuum pump may be controlled by an operating temperature set point of the chiller, may be controlled by powering on a second vacuum pump, may be controlled by varying a speed or duty cycle applied to a engine generator, may be controlled by changing the speed of a wiper of an evaporator, or may be controlled by other means.

After an extraction is performed, a drying system may be used to dry solvent saturated plant matter, such a drier may circulate a gas and collect solvent vapor in a solvent trap. Such a drier may circulate a gas through an extraction chamber using a vacuum pump. In such an instance the solvent trap may be coupled to port at the extraction chamber, where the vacuum pump may be coupled to the solvent trap and to another port at the extraction chamber. As gas is recirculated, plant matter may be dried as solvent is collected in the solvent trap. Such a solvent trap may include a condenser that may be coupled to a chiller. Power consumed by different pieces of equipment (e.g. a vacuum pump or a chiller) used in a drier that dries solvent saturated plant matter may also be included in the power budget. Recirculated gas could be a dry inert gas, such as nitrogen or could include another gas such as air.

An electrical power budget may include measures of electrical power associated with different electrical and electronic apparatus discussed above. An overall energy budget may include metrics or parameters related to energy provided to a co-generation system (such as the co-generator of FIG. 6) and may include any relevant measures of electrical power provided to an extraction/separation system. Note that the power budget associated with an extraction and separation system may include energy metrics or parameters from several different stages of production. As such a power budget may include one or more extraction stages, one or more separation stages, and a drying stage, for example. When each stage is operating continuously according to a manufacturing protocol, each respective stage may be associated with the overall electrical power budget that corresponds to a sum of power budgets from each respective stages or processes. As such, an overall power budget may include many factors, such as that may include extractor power PEx metric, a drier power PD metric, a first separation power PS1 metric, and a second separation power metric PS2, where a total electrical power PT could be calculated using the equation: $PT=PEx+PD+PS1+PS2$. A power generation system may be designed to operate at or near a maximum power operating point or may be designed to operate at a power level that is less than a maximum power operating point.

In certain instances, thermal power captured and re-used may also be factored into an overall energy budget or power budget equation. Re-using waste heat may result in a reduction or offset of required electrical power. Such an equation could be calculated according to the formula: $PT=PEx+PD+PS1+PS2-\alpha THS2$. In such an instance, factor $\alpha THS2$ may correspond to a portion of thermal energy or power gained from heat energy provided to the second separator. As such, thermal energy may reduce electrical power budget requirements by essentially increasing overall efficiency of an apparatus consistent with the present disclosure.

Figure 7:
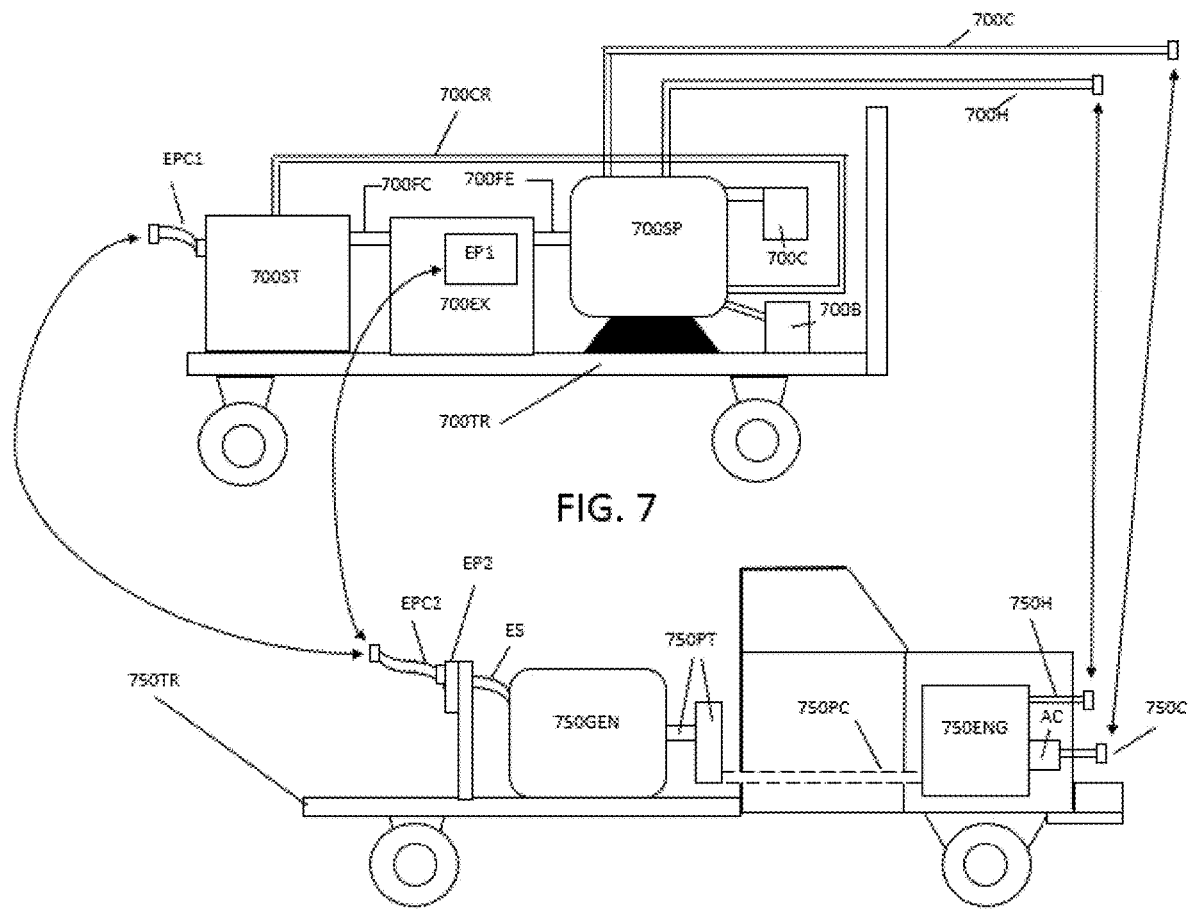
FIG. 7 illustrates two different mobile vehicles consistent with the present disclosure that may be used to transport equipment from one location to another.

FIG. 7 illustrates two different mobile vehicles consistent with the present disclosure that may be used to transport equipment from one location to another. FIG. 7 includes mobile transporter 700TR that is a wheeled vehicle that may be pulled as a trailer by a motorized vehicle. FIG. 7 also includes mobile vehicle 750TR that may be used to transport equipment consistent with the present disclosure. In certain instances mobile transporter 700TR may be pulled by mobile vehicle 750TR or that may be pulled by a semi-truck, for example.

Mobile transporter 700TR includes solvent storage tank 700ST, extractor 700EX, and separator 700SP. Solvent storage tank 700ST may contain clean solvent that can be transported to extractor 700EX when extracting essential elements from plant matter. Clean solvent may be moved to extractor 700EX through feed tube 700FC. In certain instances the clean solvent may be moved from solvent storage tank 700ST to extractor 700EX using one or more pumps, such as the vacuum pumps and solvent pumps discussed in the various patent specifications and patent application specifications that are incorporated by reference into the present disclosure. Extractions performed at extractor 700EX may be performed using the various techniques or apparatus discussed in patent specifications and patent application specifications that are incorporated by reference into the present disclosure. Extractor 700EX may, therefore, circulate or recirculate solvent or an eluate, may recirculate a gas through extractor 700EX, or both. Extractor 700EX may also include other equipment that may accelerate an extraction, for example a sonic/ultrasonic emitter, a radio wave emitter, a microwave emitter, a centrifuge that rotates plant matter, a mixing device, or pumps that circulate or chop plant matter.

Extractor 700EX includes feed pipe 700FE that may feed a solution from extractor 700EX to separator 700SP where a separation may be performed. In certain instances an eluate that includes solvent and plant matter essential elements may be passed to separator 700SP from extractor 700TR. Separator 700SP of FIG. 7 includes output apparatus 700B that may receive a first type of material output by separator 700SP. Output apparatus 700B may include an output pipe or tube that is coupled to a vessel that can receive materials that were not evaporated in separator 700SP when separator 700SP is an evaporator. As such, apparatus 700B may receive heavier materials extracted by the extractor that may include, so called bottoms materials that may include waxes, chlorophyll, sugars, or salts collected during a plant extraction. Separator 700SP also includes output apparatus 700C that may collect essential elements from the plant matter that may be in the form of a concentrate. Conduit 700CR may be in the form of a tube, pipe, or hose that transports clean solvent from separator 700SP to solvent storage tank 700ST as that clean solvent is separated from other materials in separator 700SP, for example. Heating conduit 700H and cooling conduit 700C may each include one or more pipes, tubes, or hoses that couple heating and cooling substances to and from separator 700SP. Heating conduit 700H may include a heating fluid input and a heating fluid output that may be like heating input 120A and heating output 120B of FIG. 1. Cooling conduit 700C may also include a cooling input and a cooling output, like cooling input/outputs 130A/B of FIG. 1.

The various pieces of equipment, tubes, or conduits illustrated in FIG. 7 may be coupled to one or more valves that may be computer controlled. These valves may be used to allow or to block the flow of solvent, fluid, liquid, or other materials from solvent storage tank 700ST, evaporator 700EX, and separator 700SP, for example.

Various pieces of the equipment illustrated in FIG. 7 may be powered electrically according to a power budget. FIG. 7 includes an electric power cable EPC1 that may be used to connect power to pumps or sensors associated with solvent storage tank 700ST, for example. Electric power could be coupled to extractor 700EX via power connector EP1, EPC1 or EP1 may be coupled to power cable EPC2 or EP2 that may be part of a power distribution system of truck 750TR. Note that the arrows between EPC1 and EPC2 indicate that these power cables may be connected. Note also that the arrows between EP1 and EPC2 indicate that power cable EPC2 may be connected to power connector EP1.

Truck 750TR includes engine 750ENG that is coupled to generator 750GEN through power coupling 750PC and power transfer system 750PT. Note that power coupling may be a shaft associated with a power take off system and that power coupling 750 may include belts, chains, or gears that couple mechanical energy from engine 750ENG to generator 750GEN. When engine 750ENG provides mechanical energy to generator 750GEN, generator 750GEN can provide electrical energy to power other systems through electrical connection ES, power connector EP2, and power cable EPC2.

As engine 750ENG is running, waste heat from the engine may be provided via heating conduit 750H that couples to heating conduit 700H of separator 700SP. Here also heating conduit 750 may include a heating fluid input and a heating fluid output. Additionally air conditioning or refrigeration unit AC may be coupled to cooling conduit 750C and to cooling conduit 700C when a coolant is circulated though separator 700SP using one or more tubes, pipes, couplings, or hoses. These heating and cooling conduits may include quick connect couplings with valves that open when a coupling is connected and that close when a coupling is disconnected. In certain instances, air conditioning/refrigeration (cooling) unit AC may be mechanically powered via a mechanical coupling. Fluid output by cooling unit AC may include any fluid or gas suitable of transferring heat, as such, this fluid may be a refrigerant such as Freon, for example. Fluid provided via heating coupling 750H may be in the form of steam, may be a heated liquid, or may be a heated gas.

Note that cooling provided by cooling unit AC may be electrically powered. Note also that additional elements may be included to control an amount of heat, an amount of cooling, or a temperature of a provided fluid when heating or cooling temperatures are provided to separation unit 700SP. Sensors may be monitored by a computer when that computer controls heating and cooling temperature. This computer may also monitor or control the transfer of solvent from the solvent tank to the extractor, the transfer of eluate from extractor 700EX to separator 700SP, or the transfer of elements (clean solvent, concentrate, or other elements) output from separator 700SP.

Other processing equipment may be in systems consistent with the present disclosure. For example power metrics may be associated with other apparatus included in or associated with an extraction/separation process. For example, machinery that processes plant materials using an oil or water, carbon dioxide $CO_2$ extractors, sonic/ultrasonic transducers, pumps, radio wave generators, microwave generators, plant chipper shredders, centrifugal extractor, or other equipment may each be assigned a power metric. As such, these other pieces of processing equipment may be associated with power or energy requirements that are described by additional terms in a power budget equation. Power budgets may identify electrical power requirements or quantities of fuels required to perform extractions or separations. In instances where $CO_2$ extractors are used, a solvent may be combined with a $CO_2$ derived concentrate to produce an eluate that can be provided to a separator when methods of the present disclosure are implemented.

Apparatus consistent with this disclosure may be built on skids or frames. These skids or frames may be mounted on or be transported by a vehicle. Such vehicle based apparatus may be supplied power by an electrical power grid or may be powered by an electric power generator. As mentioned above, electrical power generators that may be used in apparatus consistent with the present disclosure may include generators powered by various fossil fuels, natural gas, hydrogen gas, or biodiesel. Furthermore, such power generators may include an internal combustion engine, may burn fuels, may use fuel cells to generate power without combustion, or both.

Figure 8:
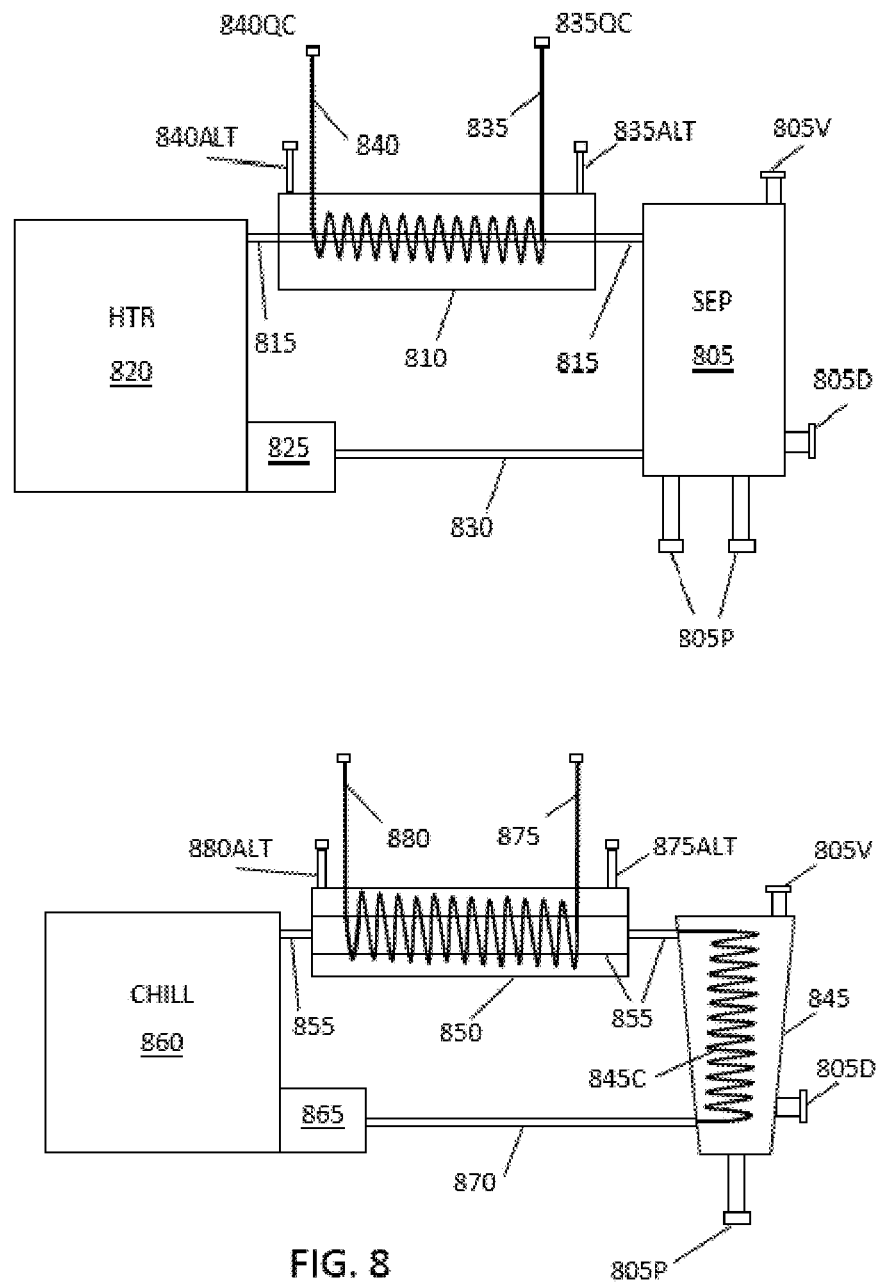
FIG. 8 illustrates exemplary heat exchangers consistent with the present disclosure.

FIG. 8 illustrates exemplary heat exchangers consistent with the present disclosure. FIG. 8. Includes separator 805, coupled to a heat exchange unit 810, and a secondary heater 820. A heating fluid may flow between separator 805 and heater 820 via conduits 815/830 and pump 825. Pump 825 may circulate a heating fluid through separator 805 as both heat exchanger 810 and heater 820 provide heat energy to the heating fluid after it exits separator 805.

Heat exchanger 810 is coupled to conduits 835 and 840 that may be used to circulate a heating fluid to heat exchanger 810 from a heat source. Conduits 840 and 835 include quick connect couplings 835C and 840C that may be used to couple heat exchanger 810 to the heat source. In one example the heat source may receive a liquid from an engine cooling system that transfers heat from the engine to heat exchanger 810. Couplings 835C and 840C may each include a valve that is closed when one or the other coupling is disconnected from the heat source. Note that heat exchanger 810 includes a coil that wraps around conduit 815. As a fluid exits separator 805 through conduit 815, heat exchanger 810 heats the fluid as it flows into heater 820. A control system monitoring an amount of heat provided to separator 805 may vary an amount of heating or an amount of cooling provided to separator 805. In such an instance the control system may vary how much thermal energy heater 820 provides to heat the heating fluid circulated between separator 805 and heater 820. Heater 820 may also be configured to cool the heated fluid circulated to separator 805 when a temperature at separator 805 has exceeded a threshold level. Pump 825 may be used to provide the heating fluid to separator 805 via conduit 830. Alternatively or additionally, a heated fluid, such a steam, may be provided based on a pressure gradient that pushes or pulls the heating fluid through an evaporator. Such a pressure gradient could be maintained by a pump that pulls the heating fluid and another pump that pushes the heading fluid. Pressure gradients can also be maintained by pressure created by the heating of the heating fluid, for example by the heating fluid being heated to an extent to change a heating fluid from a liquid phase to a gas phase.

Heat Exchanger 810 also illustrates a second set of conduits 835ALT and 840ALT that may be used to transfer heat to a heating fluid in conduit 815. Note that conduits 835ALT and 840ALT provide access to an internal portion of heat exchanger 810 that surround conduit 815. Heat exchanger 810 illustrates two different configurations that may be associated with the design of a heat exchanger. In certain instances, heat exchangers consistent with the present disclosure may include one or multiple heat exchangers. In one example, a first set of conduits 835 and 840 may circulate a heated oil and a second set of conduits 835ALT and 840ALT may circulate another heated liquid (water/antifreeze) or visa versa, for example.

Separator 805 of FIG. 8 also includes output ports 805P that may each output different substances when a separation is performed. Separator 805 also includes ports 805V and 805D. Port 805V could be coupled to a vacuum pump and port 805D could be coupled to a source of material that may include substances extracted from a *cannabis* plant, for example Alternatively or additionally, the heated fluid temperature provided to separator 805 may be cooled via a radiator (not illustrated). The control system may be configured to transfer a sufficient amount of heat energy to separator such that separator 805 is heated according to a protocol while the engine temperature is sufficiently controlled. Here again a radiator may be used to controllably cool the engine when an engine temperature exceeds a threshold amount. Radiators coupled to heating systems or to an engine coolant system may include valves that controllably switch a flow of fluid through or around a radiator.

FIG. 8 also includes a condenser 845 coupled to a coolant chamber 850 and to a chiller 860 via conduits 855 and 870. In certain instances, coolant chamber 850 may include an expansion chamber where a cooling fluid may expand in the cooling chamber 850. Note that the size of conduit 855 increases when conduit 855 enters cooling chamber 850. Coolant fluid may be circulated through condenser 845 and chiller 860 via conduits 855 and 870 by pump 865 as condenser 845 condensates particular materials in a controlled way using coil 845C. Coolant chamber 850 may be coupled to a refrigerant system or other cooling unit that receives energy from the engine. Coolant recirculated through coolant chamber 850 may be coupled to a compressor that compresses a refrigerant, where that refrigerant may expand into a gas in the portion of conduit 855 that is inside coolant chamber 850.

The coolant conduits 875 and 880 may also include valved quick connect couplings that close when conduit 875 or 880 is disconnected from a coolant source. Such a coolant source may include a compressor or chiller (not illustrated) powered by a mechanical linkage. Alternatively or additionally, such a compressor or chillers may be powered by electrical energy or may include more than one compressor that may be used to compress a refrigerant from a gaseous state to a liquid state, for example. Coolant chamber 880ALT and 875ALT are a second set of conduits that may also be used to provide a coolant to coolant chamber 850. Like heating chamber 810 may include one form of heater or multiply, coolant chamber 850 may be configured to include one or more coolants. When more than one set of coolant conduits are used, a first conduit set may provide a refrigerant and the other may provide a chilled liquid (e.g. water or an antifreeze). In an instance were conduits 880ALT and 875ALT are used to provide a refrigerant, that refrigerant would could expand within coolant chamber 850 causing a temperature associated with coolant chamber 850 to be reduced. Condenser 845 may be coupled to or be incorporated within separator 805. Chiller 860 may be any type of chiller consistent with the present disclosure.

Condenser 845 also includes output port 805P through which a condensate may be output. Condenser 845 also includes ports 805V and port 805D. Port 805V may be coupled to a vacuum pump or and port 805D may be used to introduce a substance in a gaseous form that is condensed into a liquid form in condenser 845, for example.

A sensor coupled to a control system may be used to monitor and control heated fluid temperatures or coolant temperatures. Temperatures associated with separator 805, heater 820, heating element 810, condenser 845, cooling element 850, and chiller may also be sensed by sensors. Such sensors may be coupled to a control system that may control an amount heat or an amount of cooling to separator 805 or condenser 845. Additionally sensors that sense operating pressure or vacuum may be included in a separator or in a condenser and those vacuum pressures or pressure gradients may be controlled by the control system.

In certain instances condenser 845 may be contained within (like the chilled unit 130 of FIG. 1) or be coupled to separator 805. In another example, port 805V of separator may be coupled to input port of 805D. In such an instance, port 805D may receive an eluate, where a solvent is evaporated in separator 805. Solvent vapor may then be output via port 805V and received by port 805D, where that solvent vapor is condensed and output via port 805P.

Figure 9:
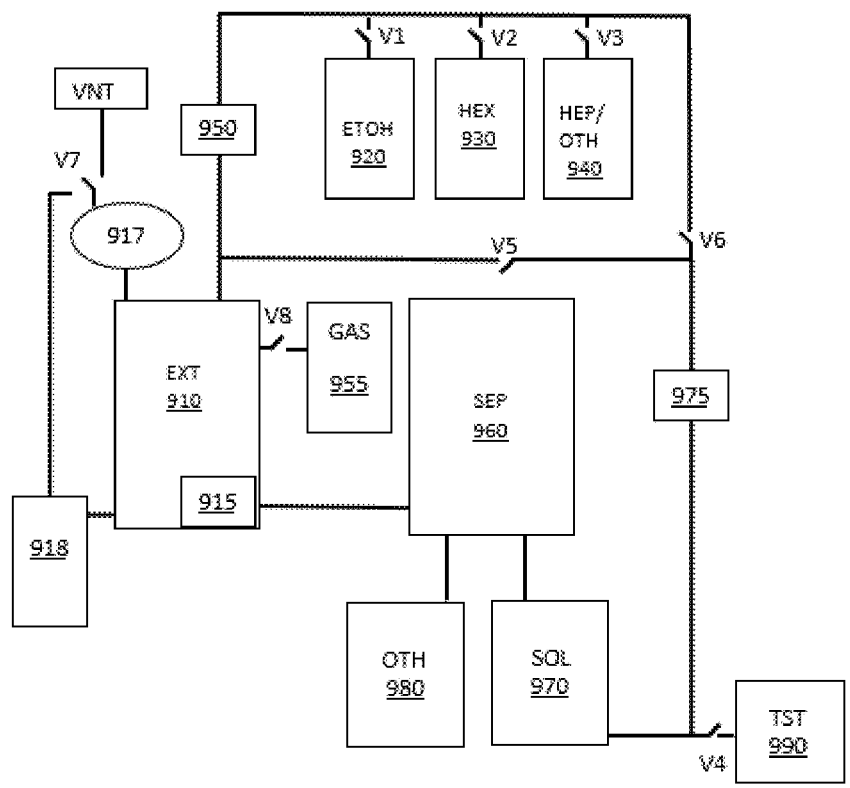
FIG. 9 illustrates various elements that may be included in an extraction/separation system that may be controlled by a control system consistent with the present disclosure.

FIG. 9 illustrates various elements that may be included in an extraction/separation system that may be controlled by a control system consistent with the present disclosure. FIG. 9 includes extractor 910, pump 915, vacuum pump 917, solvent trap 918, alcohol (ETIO) supply tank 920, hexane (HEX) supply tank 930, heptane or other (HEP/OTH) supply tank 940, conditioning unit 950, gas supply (GAS) 955, separator (SEP) 960, output vessels (SOL & OTH) 970 & 980, pump 975, tester (TST) 990, and valves V1-V8. Note that fewer or additional supply tanks may be used in different instances. Such additional supply tanks may contain any other desired solvent including, yet not limited to pet-ether, ether, or water.

In operation, plant matter may be placed in extractor 910 and an access port/door (not illustrated) on extractor 910 may be closed. Valves V1-V3 may be used to connect a particular solvent source 920, 930, or 940 by closing one of valves V1, V1, or V3 when solvent is moved from a respective tank 920-940 to perform an extraction. Solvent may be moved from a particular solvent tank by suction provided by a vacuum pump 917 when valve V7 is connected to a vent VNT. Alternatively or additionally solvent may be moved from the particular solvent tank 920-940 using conditioning unit 950. Conditioning unit 950 may include any of a pump, a chiller, or a heater. When a vacuum pump is used, atmospheric air may be removed from extractor 910 and valve V8 may be closed to provide a gas that does not include oxygen (e.g. nitrogen). After extractor 910 has been sufficiently filled with solvent, the valve used to connect extractor 910 with a respective solvent tank may be opened and valve V8 may be closed gas supply 955 may then supply a gas to extractor 910. Gas supply 955 may include or a nitrogen tank or a nitrogen generator that extracts nitrogen from atmospheric air, or both. Alternatively, air may be used instead of a dry inert gas. Once extractor 910 is sufficiently filled and after valve V7 is connected back to extractor 910 via trap 918, vacuum pump 917 may circulate the gas in extractor 910 through valve V7 and trap 918, and back into extractor 910 agitating the plant matter with a gas that bubbles in the liquid solvent, thereby, forming an eluate. In certain instances the gas may be provided or circulated using one or more nozzles. The gas may be recirculated using a vacuum pump.

After an extraction is complete or as that extraction is performed, pump 915 may provide eluate to separator 960 that performs a separation that fills output vessels 970 and 980. For example, vessel 970 may be filled with clean solvent and vessel 980 may be filled with cannabinoids. One or more output tanks may be coupled to other systems. For example, tester 990 may be coupled to output tank 970 when the purity of a solvent is tested. Such test results may be used by a control system to identify that a solvent and that an extraction/separation system is free from contaminates. Clean solvent, as verified by the control system may then be passed back to a proper solvent tank 920-940 through valve V6 and one of valves V1-V3.

After an extraction, eluate included in extractor 910 may be passed to separator 960 and vacuum pump 917 may then circulate gas (nitrogen, for example) through extractor 915 when drying (removing solvent from) the plant matter by trapping it in trap 918. Trap 918 may include a chiller, condenser, or may include a Wolfe bottle.

Such a control system may also be configured to clean a contamination from such a system, once detected, by recirculating solvent from tank 970 through valve V5, extractor 910, and separator 960. Such a circulation may be controlled using pump 975. In such an instance, contaminates may be output through output 980, while solvent is output through vessel 970. Such a recirculation could be performed until the contaminant was eliminated or reduced below a threshold level. Alternatively or additionally, tester 990 may be coupled (using valves and plumbing not illustrated in FIG. 9) to an output of extractor 910 to identify a moment when an extraction is complete, such a determination may be made by the control system monitoring cannabinoid levels or other metrics associated with an extraction process based on receiving test results from tester 990. Pump 975 may also pump solvent back to a solvent tank through valve V6.

A control system consistent with the present disclosure may be configured with different operating parameters based on a type of solvent and a type of separation process. Conditioning unit 950 valves V1-V3 may be controlled by control system to provide a controlled amount of particular solvents to extractor 910. The control system may also control an amount of heating or cooling provided to solvents provided to extractor 910. A first exemplary configuration may use chilled alcohol (ETOH) to extract essential elements from plant matter. A second exemplary configuration may use hexane to extract essential elements from plant matter. A third exemplary configuration may use provide a warmed solvent to extractor 910 after a plant extract (e.g. an extract that contain cannabinoids and other elements or a $CO_2$ derived *cannabis* plant extract) has been place inside of extractor 910 or another vessel not illustrated in FIG. 9. A fourth configuration may provide a mixture of water, alcohol, and hexane in controlled volumes to extractor 910 after a plant extract has been placed inside of extractor 910 or a vessel. Each of these various exemplary configurations may be associated with specific sets of operating parameters associated with a particular type of separation. Pressures or temperatures associated with the evaporation of any particular solvent or element may be controlled. Certain specific pressures or temperatures may be associated with evaporating or condensing alcohol, hexane, water, cannabinoids, terpenes, or other materials according to a set of protocols associated with a type of separation. In operation, a particular material (e.g. plant matter or plant extract) may be provided to extractor 910 and a particular type of extraction or separation configuration may be identified before a particular process is initiated. In such an instance, a person may load the extractor 910 with the particular material and make selections via a user interface of the control system before the particular process is initiated. Here again sensors sensing flow rates, an amount of mass or volume output, separation temperatures, condensation temperatures, heat transfer, or electrical power may be monitored by the control system when an extraction or separation process is performed according to a particular protocol. Furthermore, testers like tester 990 of FIG. 9 may be used to test elements output from an extractor or from a separator. Such testers may be any tester capable of identifying different essential elements associated with the plant matter (e.g. cannabinoids, terpenes, waxes/fats, or plant particulates) or with contaminates (e.g. mold spores, pesticides, or fertilizers). Exemplary testers include a gas chromatograph (GC), a high performance liquid chromatograph (HPLC), or an optical spectrograph. Note also that pumps included in the present disclosure may include vacuum pumps, metering pumps, solvent pumps, or other pumps consistent with use when producing foods or pharmaceuticals.

As mentioned previously, extractors consistent with the present disclosure may also include generators or emitters that emit energy in different forms such as one or more sonic/ultrasonic emitters, one or more radio wave emitters, or one or more microwave emitters. Each of these emitters may be associated with a portion of an energy budget. An amount of energy provided to a particular emitter may be associated with an extraction protocol. As an extraction is being performed and when that extraction is stimulated by an emitter, an output of an extractor may provide materials to a tester, such as the tester of FIG. 9, and a control system may control an amount of power or a type of energy to provide to an extraction system to operate according to the extraction protocol. As such the control system may identify that an amount of a particular energy type should be increased or decreased and the control system may provide additional or a reduced amount of power to one or more emitters as an extraction process is performed. Sonic waves used in an extractions may span frequency ranges of 20 Hertz (Hz) to 20 kilo-Hertz (20 KHz). Ultrasonic emitters may emit energy in the range of 20 KHz to over 200 Mega-Hz (MHz) (period of less than 1.9 centimeters-cm). Radio stimulation waves may include any radio frequency in the radio spectrum, and microwaves may include frequencies in the range of over 200 MHz to about 300 Giga-Hz (GHz) (period of nearly 1 millimeter-mm to about 1 meter).

Figure 10:
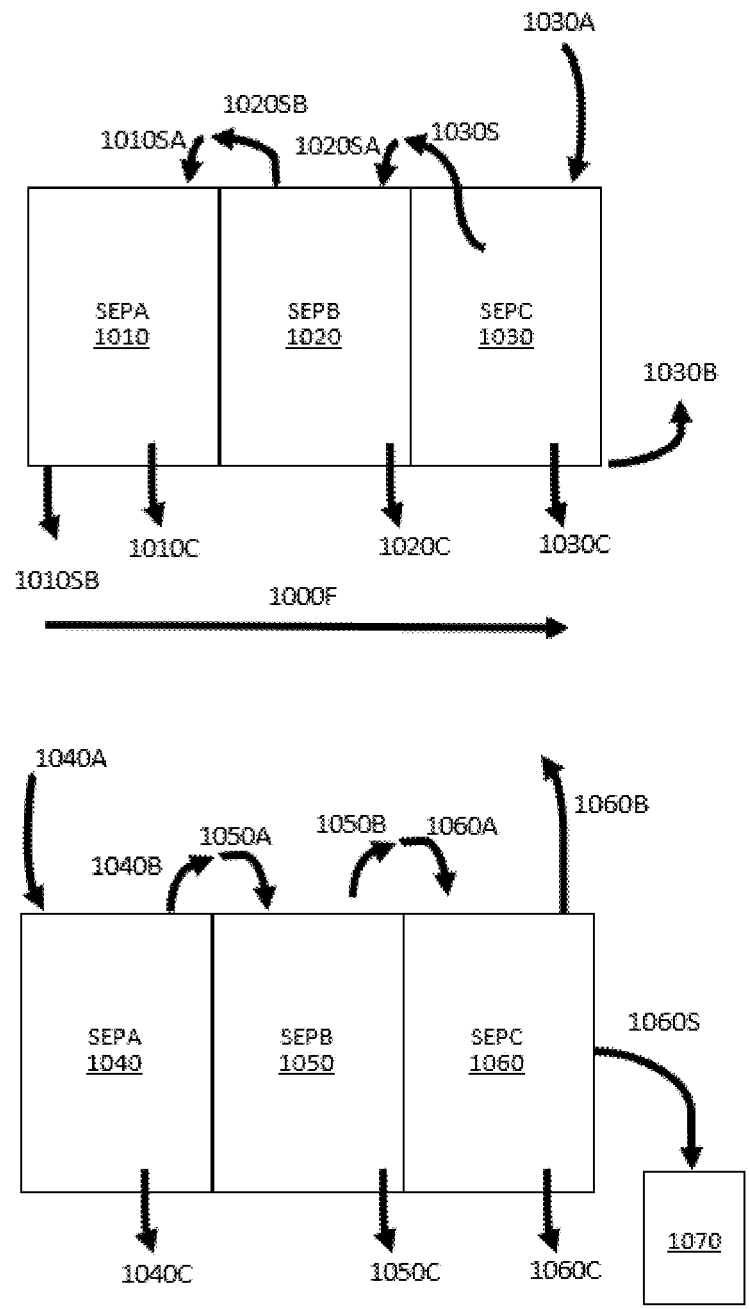
FIG. 10 illustrates two different configurations of staged separators.

FIG. 10 illustrates two different configurations of staged separators. A first set of staged separators includes separators 1010, 1020, and 1030. Separator 1030 receives heat energy in via input 1030A. This heat energy may be provided by a heated fluid that circulates through a portion of separator 1030 via input 1030A and output 1030B. Thermal energy may be provided to each of these separators via a heating jacket of a wiped film evaporator, for example. In such a configuration separator 1030 may be associated with a hottest temperature, separator 1020 may be associated with a second hottest temperature, and separator 1010 may be associated with a cooler temperature. Heated solvent may flow from an interior of separator 1030 to a heating jacket of 1020 through port 1020SA and flow out of port 1020SB. This heated solvent may then flow into a heating jacket of separator 1010 through port 1010SA and flow out of separator 1010 via port 1010SB. By the time that solvent exits port 1010SB, the solvent may have condensed from a vapor into a liquid. Alternatively or additionally port 1010SB may be coupled to a condenser that condenses solvent exiting from port 1010SB.

The transference of heat energy through separators 1010-1030 moves from the right to the left: from separator 1030, to separator 1020, and then to separator 1010. The transference of materials being processed/separated moves from the left to the right as indicated by arrow 1000F: from separator 1010, to separator 1020, and then to separator 1030. Heavier materials that are condensed in separator 1010 may be output via port 1010C. A next set of materials lighter than those condensed in separator 1010 may be condensed in separator 1020 and these next set of lighter materials may be output via port 1020C. Finally, a third set of even yet lighter materials may be output via output 1030C of separator 1030. In certain instances, output 1010C may output heavier terpenes known as sesquiterpenes, output 1020C may output a cannabinoid, output 1030C may output elements lighter than the cannabinoids (e.g. monoterpenes), and output 1010SB may output solvent or solvent vapor that is condensed in. Output 1010SB may be coupled to a condenser that condenses solvent vapor into liquid solvent.

The second set of staged separators in FIG. 10 include separator 1040, separator 1050, and separator 1060. A heating fluid may be provided to heating input 1040A of separator 1040, a first condensate may be output via port 1040C, and the heating fluid may be passed to separator 1050 through output 1040B and input 1050A. Separator 1050 may then output a second condensate out of output 1050C and pass the heating fluid to separator 1060 via output 1050B and input 1060A. Separator 1060 may then output a third condensate out of output 1060C and output the heating liquid out of output 1060B back to a heat source. Separator 1060 may also output material out of output 1060S that may be collected or condensate in vessel 1070. In certain instances, output 1040C may output heavier elements (heavier terpenes or sesquiterpenes), output 1050C may output a cannabinoid, output 1060C may output elements lighter than the cannabinoids (e.g. monoterpenes), and output 1060S may output solvent or solvent vapor that is condensed in vessel 1070. Vessel 1070 may be or include a condenser. In this second set of staged separators 1040, 1050, and 1060 material flow also flows from left to right as indicated by arrow 1000F and heat flow also flows from left to right. Here again the heating fluid may flow through a heating jacket of an evaporator.

Figure 11:
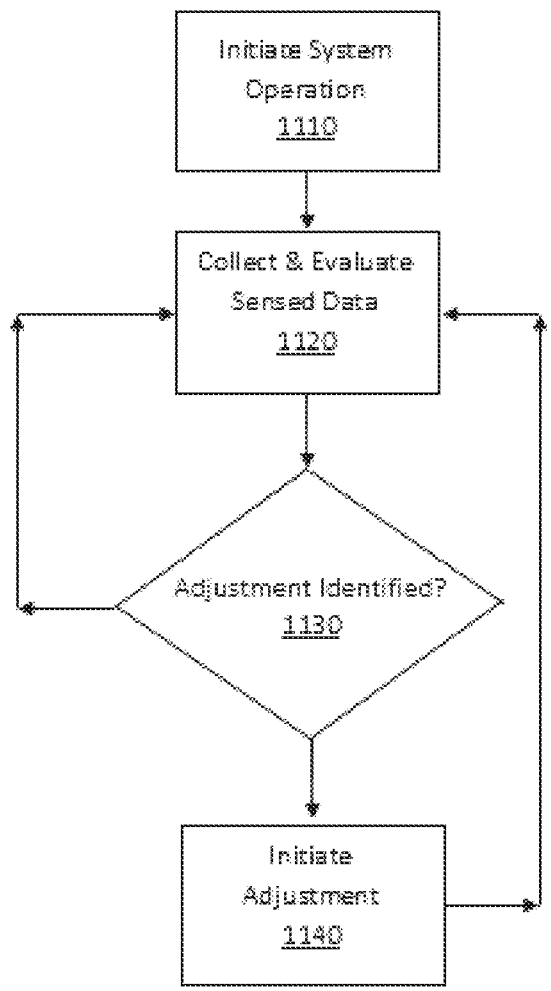
FIG. 11 illustrates an exemplary method consistent with the present disclosure that may be implemented by a control system.

FIG. 11 illustrates an exemplary method consistent with the present disclosure that may be implemented by a control system. In step 1110 of FIG. 11 operation of at least a portion of an extraction/separation system may be initiated. This initiation step may include providing heat to a separator and providing coolant to a condenser. Alternatively step 1110 may include heating a fluid that can be provided to a separator and/or cooling a fluid that can be provided to a condenser. Step 1110 may also include heating or chilling a solvent. This initiation step may be performed while a vehicle is being driven down the road before that vehicle has arrived at a location where an extraction or a separation process will be performed.

At a point in time after heaters and coolers have been pre-heated and pre-chilled, an extraction and/or a separation process may be initiated and the control system may collect sensor data and evaluate that collected sensor data in step 1120 of FIG. 11. As previously mentioned, such sensor data may include one or more flow rates of material, heating temperatures, cooling temperatures, pressures, or test results. One sensor may be used to monitor the flow of eluate from an extractor as it flows into a separator. A second sensor may be used to monitor a separator heating temperature and a third sensor may be used to monitor a cooling temperature of a condenser. A fourth sensor may measure an amount of material output from a separator or condenser. An amount of material output from the separator or condenser may be monitored using a flow sensor, using a sensor that measures a weight output to an output vessel, or using a level sensor. Such sensors may be any form of sensor known in the art. A fifth sensor may be used to monitor an amount of material output to a second stage of a separation system. Using this sensor data, a control system may identify whether the separation and condensation of various materials are operating according to a separation/condensation protocol in step 1120 and step 1130 may identify whether an adjustment is required to keep the separation/condensation system running according to the protocol in step 1130. When no adjustment is required the method of FIG. 11 may move from step 1130 back to step 1120 where sensor data is once again collected and evaluated.

When the control system identifies that an adjustment is required, one or more adjustments may be made. For example, if a temperature of a heating jacket of an evaporator has cooled below a threshold level, additional heat may be applied to a heating fluid provided to the evaporator to maintain an optimal evaporation rate in step 1140 of FIG. 11. Alternatively or additionally, a flow rate of eluate into the separator may be reduced. Such a reduction of input flow rate should allow the heating temperature at the separator to be maintained more easily. Another adjustment that may be performed at a separation apparatus may include increasing to decreasing an amount of cooling applied to a cooling fluid such that a temperature of a condenser may be maintained according to the protocol.

Figure 12:
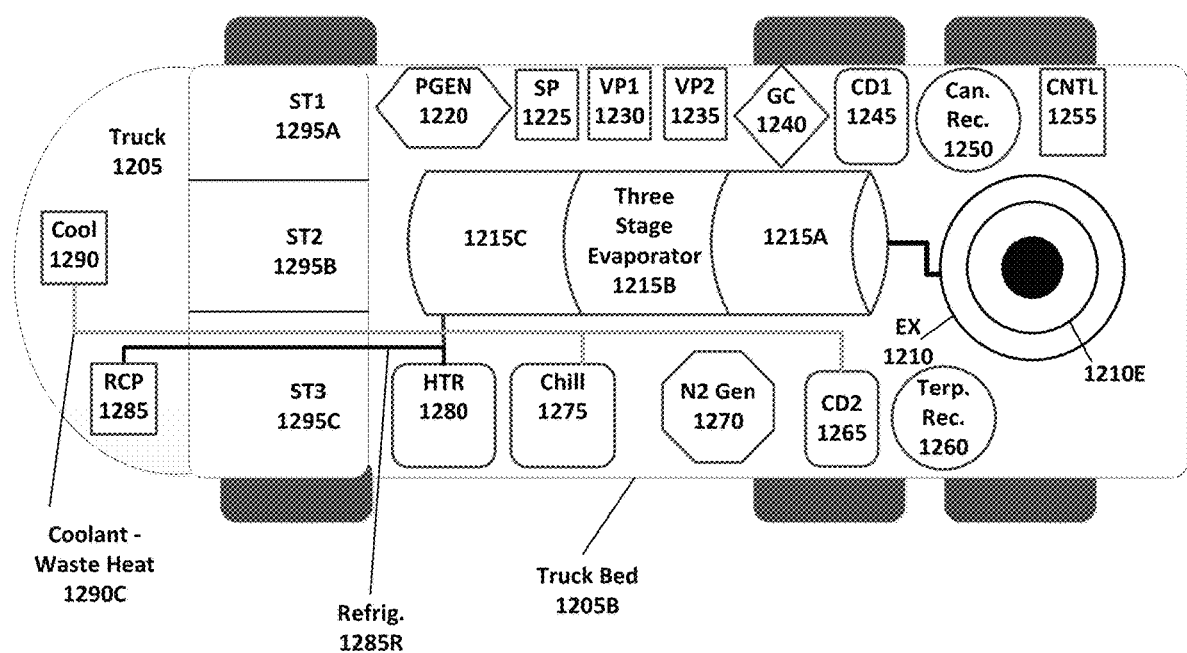
FIG. 12 illustrates extraction and concentration apparatus and other equipment mounted on the bed of a truck.

FIG. 12 illustrates extraction and concentration apparatus and other equipment mounted on the bed of a truck. FIG. 12 includes truck 1205, extractor 1210, a three stage wiped film evaporator 1215A-C, power generator 1220, a solvent pump 1225, a first vacuum pump (VP1) 1230, a second vacuum pump (VP2) 1235, a tester (e.g. a gas chromatograph or high/ultra pressure liquid chromatograph, or other) 1240, a first condenser (CD1) 1245, a cannabinoid recovery tank 1250, a controller 1255, a terpene recovery tank 1260, a second condenser (CD2) 1265, a nitrogen (N2) recovery tank 1270, a chiller 1275, a heater 1280, a refrigerant compressor 1285, a coolant-waste heat source 1290, and three different solvent tanks 1295A-C (1295A, 1295B, & 1295C). Truck 1205 includes truck bed 1205B on which many of various the different pieces of equipment are illustrated in FIG. 12 are mounted on. Truck 1205 also includes a refrigerant distribution pipe 1285R that is coupled to refrigerant compressor 1285 and Truck 1205 also includes a coolant-waste heat pipe 1290C that is coupled to coolant-waste heat source 1290. Extractor 1210 may include an extraction enhancing element 1210E that may be used to assist an extraction process. Extraction element 1210E may include or be one or more of an extraction nozzle, a centrifugal rotation unit, a sonic stimulator, an ultrasonic stimulator, a microwave energy source, or other stimulator.

Note that for simplicity, FIG. 12 does not illustrate all possible locations to which distribution pipes 1285R & 1295C may be coupled to and does not include all possible valves that may be used to control the flow of refrigerants or coolant-waste heat to different apparatus of extraction separation systems consistent with the present disclosure. Refrigerants or heated coolant may be further heated or cooled by operation of heater 1280 or chiller 1275 before those refrigerants or heated fluids are provided to evaporators, condensers, solvent tanks, or extractors consistent with the present disclosure. The distribution of heating and cooling fluids may be controlled by controller 1255. Controller 1255 may be configured to transport refrigerants or heating fluids to equipment as truck 1205 moves to an extraction site or when normal extraction or separation operations are performed. As such, controller 1255 may be configured to have several different operational modes that may include an initiation mode, a standard operational mode, and a cleanup mode, for example.

Controller 1255 may be a type of controller similar to the controller of FIG. 4, where a processor is used to control operations performed by any of the apparatus illustrated in FIG. 1-3 or 5-10. Alternatively or additionally controller 1255 may include components of a logical state machine, a field programmable gate array (FPGA), an application specific integrated circuit (ASIC), sensors (that sense any type including, yet not limited to pressure, vacuum, temperature, vapor, or liquid level), controlled actuated valves (actuated pneumatically electrically, for example), heaters, chillers, vacuum pumps, solvent pumps, gas generators (e.g. nitrogen or hydrogen), and extraction stimulators (e.g. a nozzle, a centrifugal, sonic/ultrasonic stimulator, a radio frequency source, or a microwave source).

As truck 1205 is transported to an extraction site refrigerant compressor 1285 may compress a refrigerant and that refrigerant may be distributed through refrigerant distribution pipes 1285R to condensers 1245 & 1265 or to condensers (not illustrated) that may be included in the three stage wiped film evaporator 1295A-C. During transportation, engine coolant heated by operation of an engine may be provided through coolant-waste heat pipe 1290C to three stage wiped film evaporator. When truck 1205 arrives at an extraction site, equipment on truck 1205 may already be heated or cooled such that an extraction may be initiated immediately after truck 1205 arrives. After the truck arrives, raw plant matter may be placed in extractor 1210 and solvent may be moved from an appropriate solvent tank of solvent tanks 1295A-C when an extraction process is initiated. Solvent may be moved to extraction vessel 1210 using solvent pump 1225 pumps solvent or by using vacuum pumps 1230 or 1235 that such solvent into extractor 1210. Solvents moved to extractor 1210 may be heated or chilled when desired. During the extraction process extraction enhancer 1210E may be used to stimulate the extraction of essential elements from plant materials. The extraction process may include nozzles that provide liquid solvent or other fluids (nitrogen/liquid nitrogen) to extractor 1210. Alternatively or additionally controller 1255 may control the stimulation extraction by controlling the rotation/spinning of the plant matter in extractor 1210, an amount of sonic/ultrasonic stimulation, or by controlling an amount of radio frequency or microwave energy that is provided to plant matter. While a single vehicle is illustrated in FIG. 12, multiple vehicles or multiple vehicle beds may be used to transport different pieces of equipment consistent with the present disclosure as illustrated in FIG. 7.

After controller 1255 initiates operation of an extraction process, materials output from extractor 1210 may be provided to a first evaporator 1215A the three stage wiped film evaporator 1215A-C, where a first separation process may be performed. Elements output from this first evaporator 1215A may be condensed and trapped or may be passed to a second evaporator 1215B of the three stage evaporator 1215A-C, where a second separation may be performed. Elements output from the second evaporator 1215B may be condensed and trapped or may be passed to a third evaporation 1215C of the three state evaporator 1215A-C). Controller 1255 may control the operation of evaporators 1215A-C in ways consistent with the operation of staged evaporators discussed in respect to FIG. 10 or may control separations in ways consistent with separators of FIGS. 1-3 and 5. Controller 1255 may be configured to perform the steps of FIG. 11 or may control the operation of any of the apparatus illustrated in FIGS. 6-9. Because of this controller 1255 may control extractions, heat transfer, secondary heaters/chillers, and separation temperatures/rates.

Sensors may also be used to monitor an amount of pressure or vacuum associated with a separator and the control system may be used to increase or decrease an amount of vacuum or pressure associated with the separator. In an instance where a vacuum pressure within an evaporator raises, a temperature associated with evaporating a particular substance may be increased in order to maintain an optimal evaporation of that substance. The control system may also be coupled to sensors associated with different states and or stages of a separation system and each stage of that system may be associated with a target evaporation temperature, a target condensation temperature, or a target pressure as that control system controls temperatures or pressures associated with the different stages of the separation system. A tester may be used to monitor materials from different parts of a separation or extraction system. Data from the tester may be used by the control system to identify that an extraction is operating according to an extraction protocol, that a separation is operating according to a separation protocol, or that a cleaning operation is operating according to a cleaning protocol. This test data may also identify when an extraction is sufficiently complete or that a cleaning operation is sufficiently complete. The control system may also monitor and control an amount of power consumed by different parts of an extraction or separation system. For example, in an instance, where a power system cannot provide sufficient energy to further heat a fluid, the control system may reduce the flow into a separator such that a power budget is not exceeded. Power may be monitored by measuring supplied voltages and currents to different components of an extraction/separation system using techniques known in the art. The control system may then use the measured voltage and currents to calculate a total amount of power consumed at a given moment.

Control systems consistent with the present disclosure may be coupled to or include a user interface that allows a user to select a protocol that may be associated with a type of input material and a type of operation. Types of input materials may include raw dried *cannabis*, freshly cut down *cannabis*, an eluate, or a concentrate. An eluate may be include a solvent of a particular type (ethanol, hexane, heptane, or other solvent for example) and plant materials extracted from a *cannabis* plant (cannabinoids, terpenes, or waxy plant materials). Solvent tanks 1295A, 1295B, and 1295C may store different solvents ethanol, hexane, or heptane. Alternatively or additionally one of solvent tanks 1295A-C may store water that may be purified. A separation protocol may use a different evaporation pressures or temperatures for each respective type of solvent. Extract inputs may also include concentrates produced by any available extraction method (extraction with solvents that are liquid at room temperature/pressure, extraction with solvents that are gaseous at room temperature/pressure, or extracted derived using carbon dioxide, for example) before or as a concentrate is formed. Such extracts may be combined with a particular solvent according to a protocol and then that extract/solvent combination may be provided to a separator where plant materials are separated. The solvent and concentrate may be combined using a machine or process that mixes or heats and mixes the extract with the solvent such that the combined solvent/extract mix may more easily flow or be pumped into a separator.

In yet another example, a turbine engine that may be capable of burning one or more types of fuels may be built on a skid/frame or be incorporated into or on a vehicle. This engine may be coupled to an electrical generator such as power generator 1220 of FIG. 12, waste heat energy from an engine or from the power generator may be provided to a separation system, and a coolant may be provided to a condenser when an extraction or separation is performed. In instances where an engine is used that can burn different types of fuels, any particular type of fuel could be used as required or that is most cost effective. For example, diesel may be burned to power a vehicle moving a separation system to a destination based on diesel fuel being available. In an instance where a farm has is supplied natural gas via a pipeline, for example, the engine may be provided natural gas from that farm supply to power an extraction or separation process. Engines consistent with the present disclosure may be capable of powering a vehicle via a direct mechanical coupling or may be used to provide electrical energy to power electrical drive motors at the vehicle. Furthermore, batteries or other energy storage devices may be included in a hybrid-electric generation system capable of powering the vehicle or a portion of an extraction separation system.

In certain instances, output (waste) gasses, such as carbon dioxide ($CO_2$) produced by burning the fuel may be provided to a greenhouse, thus providing plants growing in the greenhouse with $CO_2$ needed for photosynthesis. Furthermore, the control system could be coupled to one or more $CO_2$ sensors such an amount of $CO_2$ provided to the greenhouse can be controlled. This may help prevent the greenhouse from being exposed to concentrations of $CO_2$ that are unhealthy or toxic to people. $CO_2$ output by the engine may be diverted via one or more valves to one greenhouse or another, or may be used to vent $CO_2$ to the atmosphere when $CO_2$ concentrations in a greenhouse approach a threshold level.

In certain instances, particular extraction and separation systems may be controlled according to two or more different power budgets. A first power budget may be associated with a first processing capability and a first power level that can be provided by an engine. A second power budget may be associated with a same system attached to one or more other power sources that may include additional generators, additional electrical energy storage devices, fuel cells, or a power grid. As such, chillers, heaters, evaporators, and/or vacuum pumps used in such a system may be capable at running according to the second power budget or to the first power budget. Such systems may include wiring or other connections capable of connecting different power sources to an extraction separation system consistent with the present disclosure. Engines consistent with the present disclosure may also be run according to a protocol that provides enough heat energy to perform a function while also using energy from other power sources to perform other functions, for example. Operations performed by an exemplary control system may automatically control the extraction and concentration form *cannabis* plant matter (such as hemp and marijuana) in a single pass will now be discussed. In certain instances, the control systems may include Wireless IEEE 802.11, Bluetooth connectivity, or other communication connections that allows operators/technicians to view a current status using a program application on a user device (e.g. a cell Phone or tablet computer). Exemplary components included in such a system may include a general purpose computer, a programmable controller (e.g. a Siemens, Allen Bradley or other industrial controller), sensors (liquid level, temperature, pressure/vacuum, flow, CO2, or other), communication interfaces (e.g. IEEE 802.3, IEEE 802.11, IEEE 8418, RS232/422, 20ma), an electric relay/switch board (that may switch devices on or off), a pneumatic relay board (that may actuate actuates valves), and a power supply (that may be coupled to a truck alternator/battery, or electrical power connection to a power grid)

Devices controlled by the control system may include a power take off (PTO) device that is coupled to an engine and an electrical generator or may include solvent pumps, testers, condensers, chillers, heaters, solvent tanks, vacuum pumps, gas generators, and automatically actuated valves. Power generator 1220 of FIG. 12 may be a part of PTO device coupled to an engine (for example an 180 KW generator (GenPac). Other devices that may be controlled by control system 1255 include solvent pump 1225, vacuum pumps 1230 & 1235, tester 1240, chiller 1275, heater 1280, nitrogen generator 1270, and valves that direct the flow of materials. Vacuum pumps 1230 & 1240 may be selected to be pumps capable of maintaining a high vacuum (low pressure) or be capable of high volumes of gases, such as a high cubic-feet-per minute (e.g. a CFM vacuum pump). Tester 1240 could, for example, be a Vorga gas chromatograph (GC). Controller 1255 may also control the flow of solvent from any of solvent tanks 1295A-C to extractor 1210 or may be configured to control the flow of extracted elements through three stage evaporator 1215A-C. Controller 1255 may also open or close valves when connecting different apparatus or when controlling the flow of nitrogen or other gas to extractor 1210.

Operation states that may be associated with the operation of an extraction separation system consistent with the present disclosure include an off state, and idle state, a load state, an extraction state, a distil state, an assay state, a drying state, a dump state, and a cleaning state. One or more of these operation states may, in certain instances be performed at a same moment in time. For example an extraction state may occur at a same time as a distil state, an extraction state may also be occur at a same time as an assay state, or a distil state may occur at same time as an assay state.

The off state may be associated with an entire shutdown of the extraction-separation system. The idle state may include running an engine while circulating compressed refrigerants (e.g. Freon or R-600a or R-290 refrigerants) and/or a heated engine coolant. The refrigerants may be passed through a condenser and the heated engine coolant may be circulated through a through an evaporator. Heated engine coolant may also pass through a heater as the controller controls temperatures provided to the evaporator.

The distil state may recover clean solvent from an eluate that includes combinations of solvent and extracted plant materials (e.g. solvent, cannabinoids, and plant terpenes). The distil state may cause cannabinoids, solvent, or terpenes to be evaporated. The distil state may also include condensing cannabinoids, solvent, or terpenes in respective collection vessels. An assay state may include the opening or closing of certain valves that cause elements to be sent to a tester that test cannabinoid levels. As such, eluate (a mixture of extracted materials and solvent) from an extractor/hopper may be tested to see when an extraction is complete.

The drying state may be include circulating dry nitrogen or other gas through *cannabis* plant matter in the extractor/hopper and may include capturing solvent in a solvent trap (such as a Woulfe bottle, solvent tank, or condenser). Controller 1255 may terminate the drying state based on sensors that sense whether post-extracted plant matter is no longer outgassing over a threshold level of solvent gasses or that sense that a level of solvent is no longer being output by the drying process. The cleaning state may include recirculating solvents of one or more types through the extractor and/or evaporators such that contaminates can be removed from the extraction separation system. The dumping state may include the temporary halting of fluid transport to or from the extractor/hopper such that the extractor or hoper may be emptied. The cleaning state may also include outputting contaminates out of an output. The cleaning state may cause solvents to be redistilled, re-condensed, and cause the solvents to be transported back to an appropriate solvent storage tank. When solvents are distilled, they may be condensed at specific temperatures such that ethanol can be separated from other solvents such as hexane or heptane, for example.

Valves consistent with the present disclosure may be pneumatically controlled, table 1 below identifies several different states that may be used direct the flow of materials to or through a system consistent with the present disclosure. Table 1 identifies valves by the letter 'V' followed by a valve number that may be actuated using pneumatic relay. Pneumatic relays may themselves include solenoid driven valves that open when a control signal is provided to a pneumatic relay. When open, the solenoid driven valves may cause high pressure gas from a nitrogen source or a compressor to actuate corresponding valves. Pneumatic relays included in table 1 are identified by the letter 'P' followed by a number that corresponds to a valve number. For example, a first row of table 1 indicates that valve V11 is actuated based on a state associated with pneumatic relay P11 and that valve V12 is actuated based on a state associated with pneumatic relay P12. The actuation of a valve may cause a spring loaded valve to be opened and the de-actuation of a valve may cause the valve to close based on the spring loading of the valve. Because of this operation of all valves may be closed if power to the system in interrupted.

Table 1 identifies that valves V1 & V12 are controlled by pneumatic relays P11 & P12. When open valves V11 & V12 cause engine coolant to be circulated from the engine to a heater. Valves V13 & V14 are controlled by pneumatic relays P12 & P14 may cause engine coolant to flow from the heat to a wiped film evaporator. Valves V11, V12, V13, and V14 may cause engine coolant to be circulated through the engine, heater 1280, and evaporators 1215A-C, for example.

Table 1 identifies that valves V21 & V22 are controlled by pneumatic relays P21 & P22 and these valves cause engine refrigerant to be circulated from refrigerant compressor 1285 to chiller 1275 of FIG. 12. Valves V23 & V24 controlled by pneumatic relays P23 & P24 to allow the refrigerant to be passed to and from condensers 1245 and 1265 of FIG. 12. Operation of Valves V21, V22, V23, and V24 may be used to circulate refrigerant through a path that may include refrigerant compressor 1285, chiller 1275, and condensers 1245 & 1265.

Table 1 identifies that valves V30, V31, & V32 are controlled by pneumatic relays P30, P31, and P32, where each of these valves may control the flow of solvent from one of solvent tanks 1295A-C of FIG. 12 to solvent pump 1225 of FIG. 12. Typically only one of valves V30, V31, and V32 will be opened at a time. Valve V38 controlled by pneumatic relay P38 may allow solvent pump 1225 to provide solvent to extractor/hopper 1210 of FIG. 12. Another valve V39 controlled by pneumatic relay P39 may allow an eluate to be provided to the three stage wiped film evaporator 1215A-C of FIG. 12.

Valve V33 controlled by pneumatic relay P33 may direct solvent flow from solvent pump 1225 to three stage wiped film evaporator 1215A-C of FIG. 12. Valve V34 controlled by pneumatic relay P34 may connect solvent pump 1225 to an output of wiped film evaporator 1215A-C. Valves V35, V36, & V37 controlled by pneumatic relays P35, P36, and P37 may be used to pump solvent output by wiped film evaporator 1215A-C to a respective solvent tank 1295A, 1295B, or 1295C.

Valves V40 and V41 controlled by pneumatic relays P40 and P41 may be used to connect vacuum pumps 1230 and 1235 to the three stage evaporator 1215A-C or to extractor 1210 of FIG. 12. As such valves V40 and V41 may be used to establish vacuum in portion of an evaporator or in an extractor and this vacuum pressure may be used to pull solvent into extractor 1210 or pull extracted elements & solvent (eluate) into evaporator 1215A-C.

Valves V43 & V44 controlled by pneumatic relays P43 and P44 may be used to circulate gas through extractor 1210 during a drying process that captures residual eluate in a Woulfe bottle or solvent trap. This drying process may include circulating nitrogen gas through the extractor. Valve V42 controlled by pneumatic relay P42 could be used to circulate elements trapped in the Woulfe bottle or solvent trap after a drying process into evaporator 1215A-C of FIG. 12.

Finally valves V70 & V71 controlled by pneumatic relays P70 & P71 may be used to couple eluate from extractor 1210 to tester 1240 of FIG. 12 or may be used to transfer extracted cannabinoids to tester 1240 for testing. Control systems consistent with the present disclosure may include more or fewer valves that may be controlled to perform extractions, separations, or to control any of the states discussed above. These actions may be performed in respect to the extractor separator of FIG. 12 or may be performed according to criteria associated generally with the present disclosure.

TABLE 1

Valves & Pneumatic Relay Control:

| Valves Actuated | Pneumatic Relay Control | |
|---|---|---|
| V11, V12 | P11, P12 | Engine Coolant source and return (to/from Heater) |
| V13, V14 | P13, P14 | Heater to/from Wiped Film water jacket |
| V21, V22 | P21, P22 | Engine Refrigerant source and return (to/from Chiller) |
| V23, V24 | P23, P24 | Chiller to/from Condensers |
| V30, V31, V32 | P30, P31, P32 | Solvent tanks to solvent pump |
| V33 | P33 | Solvent pump to Wiped Film |
| V34 | P34 | Solvent pump from Wiped Film |
| V35, V36, V37 | P35, P36, P37 | Solvent from pump to Solvent tanks |
| V38, V39 | P38, P39 | Solvent pump to Extractor & Extractor to Wiped Film |
| V40, V41 | P40, P41 | Vacuum pumps to Wiped Film or Extractor |
| V42 | P42 | Vacuum pump Woulfe bottle to Wiped Film (after drying) |
| V43, V44 | P43, P44 | Vacuum pump from top into bottom of Centrifuge (for drying) |
| V70, V71 | P70, P71 | Cannabinoids to Gas Chromatograph and return |

Table 2 illustrates exemplary components that may be included in an electric/electronic relay board consistent with the present disclosure. Electric or electronic relays consistent with the present disclosure may include any type of electrically controlled relay known in the art that include solenoid driven relays or solid state relays that make temporary or continuous contact when turning on an electrical apparatus. Table 2 identifies that relay R01 when engaged starts an engine consistent with the present disclosure. Relay R02 may be used to engage a power take off (PTO) system. This PTO system may be coupled to a generator that begins to generate power after the engine is started and after the PTO is engaged. Relays R11 and R12 may be used to turn on a heater and a pump that assists in heating a fluid provided to a wiped film evaporator and in pumping the heating fluid through the wiped film evaporator.

Table 2 identifies that relays R13 and R14 start a chiller and a pump that may be included in or attached to the chiller. Relays R07 and R08 of FIG. 2 may turn on a nitrogen generator and may turn on a compressor that compresses nitrogen into a nitrogen tank. Relay R30 may turn on a solvent pump that provides solvent to one or more apparatus consistent with the present disclosure. Similarly relays R40 & R40 may turn on respective vacuum pumps of apparatus consistent with the present disclosure. Relay R70 may turn on a tester consistent with the present disclosure and R50 may activate an extraction enhancing element such as element 1210E of FIG. 12. As such, R50 may provide electrical power to excite an extraction nozzle, to rotate an extractor centrifugal rotation unit, to engage a sonic/ultrasonic simulator, to provide power to a microwave energy source/ emitter used to stimulate an extraction. Furthermore relay R60 may initiate rotation of a wiped film evaporator.

TABLE 2

Electric/Electronic Relays

| Electric-Electronic Relay | Power Applied To: |
|---|---|
| R01 | Engine Start |
| R02 | Engage PTO, turn Generator Power On |
| R11, R12 | Heater and Pump |
| R13, R14 | Chiller and Pump |
| R07, R08 | Nitrogen Generator |
| R30 | Solvent Pump |
| R40, R41 | Vacuum Pumps |
| R70 | Tester, Gas Chromatograph |
| R50 | Centrifuge, Extractor/Hopper |
| R60 | Wiped Film Rotation |

Table 3 review exemplary sensors of certain types that may be used to sense data that a control system consistent with the present disclosure may use when the control system controls operation of various states of an extraction separation system consistent with the present disclosure. Table 3 includes sensors S01, S02, and S03 that may be solvent level sensors that measure a level of solvent in different solvent tanks, such as solvent tanks 1295A-C of FIG. 12. Table 3 includes sensors S50, S80, and S81 that respectively measure levels of solvent in an extractor/hopper/vessel, in a cannabinoid recovery tank, and in a terpene recovery tank, such as extractor 1210, cannabinoid recovery tank 1250, and terpene recovery tank 1260 of FIG. 12.

Table 3 also includes temperature sensors S61, S62, S63, S11, S13, S21, S22, and S23 that respectively measure three different jacket temperatures of heating jackets of three different stages of a wiped film evaporator (S6, S62, and S63), a heater temperature (S11), a chiller temperature (S13), and three temperatures (S21, S22, & S23) of different vapors in different condensers. As such sensors could sense temperatures of heating jackets in each of evaporators 1215A-C, temperatures of fluids heated by heater 1280, temperatures of fluids chilled by chiller 1275, and temperatures inside of different condensers 1245 & 1265 of FIG. 12. Vacuum levels/pressures located in an extractor (e.g. 1210) or evaporator (e.g. 1215A-C) may be sensed (S41 & S42), and a pressure sensor (S07) that may measure pressure of nitrogen or other gasses in a nitrogen collection vessel or in an extractor (e.g. item 1210 of FIG. 12). Sensors included in table 3 may provide data to a control system that controls operations consistent with the present disclosure. The sensors included in table 3 are exemplary and apparatus consistent with the present disclosure may include fewer or more sensors or sensors of a different type than those discussed in respect to table 3. For example, sensors may sense power consumption consumed by different apparatus of the present disclosure when a controller controls operation of the system within a power budget.

TABLE 3

Exemplary Sensors

| Sensors | Sense Type/Function |
|---|---|
| S01, S02, S03 | Solvent Level |
| S50 | Extractor/Hopper Level |
| S80 | Cannabinoid Tank Level |
| S81 | Terpene Tank Level |
| S61, S62, S63 | Wiped Film Jacket Temperatures |
| S11 | Heater Temperature |
| S13 | Chiller Temperature |
| S21, S22, S23 | Vapor Temperatures in Condensers |
| S41, S42 | Vacuum Levels |
| S07 | Nitrogen Pressure |

The various methods may be performed by software operating in conjunction with hardware. For example, instructions executed by a processor, the instructions otherwise stored in a non-transitory computer readable medium such as memory. Various interfaces may be implemented—both communications and interface. One skilled in the art will appreciate the various requisite components of a mobile device and integration of the same with one or more of the foregoing figures and/or descriptions.

While various embodiments have been described above, it should be understood that they have been presented by way of example only, and not limitation. The description are not intended to limit the scope of the presently claimed invention or to limit the scope of embodiments of the present invention. The present descriptions are intended to cover alternatives, modifications, and equivalents consistent with the spirit and scope of the disclosure.

What is claimed is:

1. A method for controlling energy distribution, the method comprising:
   heating at least a portion of a first separator by transferring thermal energy generated by operation of an engine to the first separator;
   providing a chilled fluid to a first condenser;
   providing a flow of a cannabinoid containing material into an input of the first separator that results in:
   a first substance included in the cannabinoid containing material being evaporated when the at least portion of the first separator is heated to an evaporation temperature, and
   the first substance being condensed at the first condenser based on a cooling temperature associated with the first condenser;
   monitoring an amount of electrical power provided to power a plurality of devices by an electronic control system, wherein the monitored amount of electrical power is generated by an electrical generator coupled to the engine; and
   making an adjustment by the electronic control system to maintain at least one of the evaporation temperature at the first separator or the cooling temperature associated with the first condenser according to a power budget when the amount of power provided to the plurality of devices approaches, meets, or exceeds a threshold level of the power budget.

2. The method of claim 1, wherein the adjustment made by the control system includes changing a flow rate of the flow of the cannabinoid containing material into the input of the first separator.

3. The method of claim 1, wherein the adjustment made by the control system includes changing a rotation speed of a wiper of the first separator.

4. The method of claim 1, further comprising providing a volume of solvent to a first vessel that is coupled to the input of the first separator when the cannabinoid containing material is created.

5. The method of claim 4, wherein the first vessel contains *cannabis* plant matter and the cannabinoid containing material is an eluate that includes cannabinoids and the volume of solvent.

6. The method of claim 5, further comprising turning on a stimulation apparatus that stimulates the *cannabis* plant matter, wherein the stimulation apparatus includes at least one of one or more nozzles, a sonic or ultrasonic emitter, a microwave emitter, a centrifuge, a stirring arm, a stirring magnet, a cavitation stimulator, a pump, a solvent pump, or a chopper pump.

7. The method of claim 4, wherein the first vessel includes a cannabinoid containing extract that is combined with the volume of solvent when the cannabinoid containing material is created.

8. The method of claim 1, wherein the adjustment made by the control system includes changing an amount of electrical energy provided to a device of an extraction apparatus device, wherein the extraction apparatus device is one device of the plurality of devices.

9. The method of claim 1, further comprising:
providing a flow of materials to a second separator from an output at the first separator;
controlling a temperature at the second separator; and
condensing a second substance from the flow of materials output from the first separator at a second condenser.

10. The method of claim 9, further comprising:
providing at least one material from the flow of materials to a third separator from an output at the second separator;
controlling a temperature at the third separator; and
condensing a third substance at a third condenser.

11. The method of claim 1, further comprising moving the engine, the first separator, and the condenser on one or more vehicles to a location where the cannabinoid containing material is processed.

12. The method of claim 1, further comprising:
monitoring by the control system an amount of electrical power received from a power source other than the generator that is provided to at least one of the plurality of devices; and
controlling an amount of power provided from the generator according to a power profile that identifies a first and a second target power consumption level, the first target power consumption level corresponding to electrical power provided by the generator and the second power consumption level corresponding to power provided by the other electrical power source.

13. The method of claim 12, wherein the controlling of the power according to the power profile includes maximizing the power provided by the generator when a cost associated with providing a number of watts or watt hours by the generator is less than a cost associated with providing the number of watts or watt hours by the other power source.

14. The method of claim 1, further comprising:
providing a first type of fuel to the engine; and
switching the type of fuel provided to the engine to a second type of fuel.

15. The method of claim 1, further comprising:
providing materials output from the first condenser to a second condenser coupled to the first condenser;
controlling a temperature associated with the second condenser; and
condensing a second substance at the second condenser.

16. The method of claim 15, further comprising:
providing materials output from the second condenser to a third condenser coupled to the second condenser;
controlling a temperature associated with the third condenser; and
condensing a third substance at the third condenser.

17. The method of claim 1, further comprising the control system:
receiving sensor data identifying a concentration of carbon related materials output as part of an exhaust gas from the engine; and
providing a portion of the exhaust gas to an area where plants are present to provide the plants with additional carbon related materials based on the sensor data.

18. The method of claim 17, further comprising the control system:
receiving sensor data that identifies a concentration of the carbon related materials in the area;
identifying that the concentration of carbon related materials in the area approaches, meets, or exceeds a threshold concentration level; and
reducing an amount of the exhaust gas provided to the area based on the identified concentration level of carbon related materials in the area.

19. The method of claim 1, further comprising identifying that additional heat energy should to be added to the generated thermal energy to maintain the temperature at the first separator, wherein the adjustment made by the electronic control system includes providing the additional heat energy to the generated thermal energy.

20. A non-transitory computer readable storage medium having embodied thereon a program executable by a processor for implementing a method for controlling energy distribution, the method comprising:
heating at least a portion of a separation apparatus by transferring thermal energy generated by operation of an engine to the separation apparatus;
providing a chilled fluid to a condenser;
providing a flow of a cannabinoid containing material into an input of the separation apparatus that results in:
a first substance included in the cannabinoid containing material being evaporated when the at least portion of the separation apparatus is heated to an evaporation temperature, and
the first substance being condensed at the condenser based on a cooling temperature associated with the condenser;
monitoring an amount of electrical power provided to power a plurality of devices by an electronic control system, wherein the monitored amount of electrical power is generated by an electrical generator coupled to the engine; and
making an adjustment by the electronic control system to maintain at least one of the evaporation temperature at the separation apparatus or the cooling temperature associated with the condenser according to a power budget when the amount of power provided to the plurality of devices approaches, meets, or exceeds a threshold level of the power budget.

21. A system for implementing a method for controlling energy distribution, the system comprising:
a separator that evaporates a first substance from a cannabinoid containing material;

a condenser that is provided a chilled fluid to condense;

an engine that heats at least a portion of the separator to a temperature that evaporates the first substance included in the cannabinoid containing material;

providing a flow of a cannabinoid containing material into an input of the separator that results in:
- a first substance included in the cannabinoid containing material being evaporated when the at least portion of the separator is heated to an evaporation temperature, and
- the first substance being condensed at the condenser based on a cooling temperature associated with the condenser;

monitoring an amount of electrical power provided to power a plurality of devices by an electronic control system, wherein the monitored amount of electrical power is generated by an electrical generator coupled to the engine; and making an adjustment by the electronic control system to maintain at least one of the evaporation temperature at the separator or the cooling temperature associated with the condenser according to a power budget when the amount of power provided to the plurality of devices approaches, meets, or exceeds a threshold level of the power budget.

\* \* \* \* \*